(12) United States Patent
Glasenapp

(10) Patent No.: US 11,313,759 B2
(45) Date of Patent: Apr. 26, 2022

(54) METHOD AND DEVICE FOR MEASURING THE LOCAL REFRACTIVE POWER AND/OR THE REFRACTIVE POWER DISTRIBUTION OF A SPECTACLE LENS

(71) Applicant: Carl Zeiss Vision International GmbH, Aalen (DE)

(72) Inventor: Carsten Glasenapp, Oberkochen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/482,853

(22) Filed: Sep. 23, 2021

(65) Prior Publication Data
US 2022/0003632 A1 Jan. 6, 2022

Related U.S. Application Data

(63) Continuation-in-part of application No. PCT/EP2020/061258, filed on Apr. 22, 2020.

(30) Foreign Application Priority Data

Apr. 23, 2019 (EP) ..................................... 19170714

(51) Int. Cl.
*G01M 11/02* (2006.01)
*G02C 7/02* (2006.01)
*G02C 7/06* (2006.01)

(52) U.S. Cl.
CPC ......... *G01M 11/0235* (2013.01); *G02C 7/027* (2013.01); *G02C 7/061* (2013.01)

(58) Field of Classification Search
CPC ... G02C 7/061; G02C 7/027; G01M 11/0264; G01M 11/0257; G01M 11/025; G01M 11/0242; G01M 11/02; G01M 11/0228; G01M 11/0235

USPC ........ 356/125, 128, 123; 351/246, 206, 205, 351/42, 159.73, 159.75
See application file for complete search history.

(56) References Cited

U.S. PATENT DOCUMENTS

| | | | |
|---|---|---|---|
| 2011/0007269 A1* | 1/2011 | Trumm | G02C 13/005 351/204 |
| 2015/0029323 A1 | 1/2015 | Nagao | |
| 2020/0088603 A1 | 3/2020 | Glasenapp et al. | |

FOREIGN PATENT DOCUMENTS

| | | |
|---|---|---|
| EP | 2392961 A1 | 12/2011 |
| EP | 2608109 A1 | 6/2013 |
| EP | 3730036 A1 | 10/2020 |
| EP | 3730037 A1 | 10/2020 |

(Continued)

OTHER PUBLICATIONS

"Ophthalmic optics—Spectacle lenses—Vocabulary"(ISO 13666:2012); German and English version EN ISO 13666:2012, Oct. 2013.

(Continued)

*Primary Examiner* — Travis S Fissel
(74) *Attorney, Agent, or Firm* — Thrive IP®; Georg M. Hasselmann

(57) ABSTRACT

The local refractive power and/or the refractive power distribution of a left and/or a right spectacle lens in a spectacle frame is measured in the wearing position on the head of a spectacle wearer by capturing at least two images of an eye of the spectacle wearer from different recording positions. The disclosure also relates to a computer program product having a computer program with program code and to an apparatus for carrying out the method.

27 Claims, 7 Drawing Sheets

(56) References Cited

FOREIGN PATENT DOCUMENTS

| | | |
|---|---|---|
| EP | 3730919 A1 | 10/2020 |
| EP | 3730998 A1 | 10/2020 |
| WO | 2016076530 A1 | 5/2016 |
| WO | 2016207412 A1 | 12/2016 |
| WO | 2017134275 A1 | 8/2017 |
| WO | 2017205903 A1 | 12/2017 |

OTHER PUBLICATIONS

Kutulakos et al. "A Theory of Refractive and specular 3D Shape by Light-Path Triangulation," University of Toronto, Proc. 10th IEEE Int. Conf. on Computer Vision, Beijing, China, pp. 1448-1455, 2005.

Teichman et al. "Unsupervised intrinsic calibration of depth sensors via SLAM," Robotics: Science and Systems 2013, Berlin, Germany, Jun. 24 to 28, 2013.

European Search Report issued in EP 19170714.0, to which this application claims priority, completed Oct. 30, 2019.

International Search Report issued in PCT/EP2020/061258, to which this application claims priority, dated Jul. 20, 2020 and English-language translation thereof.

Hartley et al. "Multiple View Geometry," pp. 153 to 193, Cambridge University Press 2004.

Hartley et al. "Multiple View Geometry," chapter 10, Cambridge University Press 2004.

Hartley et al. "Multiple View Geometry," chapter 18, Cambridge University Press 2004.

Kutulakos et al. "A Theory of Refractive and specular 3D Shape by Light-Path Triangulation," International Journals of Computer Vision, vol. 76, issue 1, pp. 1 to 32, 2008.

Grauman et al. "Visual Object Recognition," Morgan & Claypool Publishers, pp. 11 to 40, 2011.

International Preliminary Report on Patentability issued in PCT/EP2020/061258, to which this application claims priority, completed Aug. 5, 2021 and English-language translation thereof.

\* cited by examiner

METHOD AND DEVICE FOR MEASURING THE LOCAL REFRACTIVE POWER AND/OR THE REFRACTIVE POWER DISTRIBUTION OF A SPECTACLE LENS

CROSS REFERENCE TO RELATED APPLICATIONS

This application is a continuation-in-part application of international patent application PCT/EP2020/061258, filed Apr. 22, 2020, designating the United States and claiming priority from European patent application EP19170714.0, filed Apr. 23, 2019, and the entire content of both applications is incorporated herein by reference.

TECHNICAL FIELD

The disclosure relates to a method for measuring the local refractive power and/or the refractive power distribution of a left and/or a right spectacle lens, typically in a spectacle frame, in the worn position on the head, typically in the face, of a spectacle wearer. Moreover, the disclosure relates to a computer program product having a computer program with program code and to an apparatus for carrying out the method.

BACKGROUND

To facilitate in-focus vision for a spectacle wearer, the spectacle lenses must be correctly positioned and aligned in the spectacle frame in relation to the eyes of the spectacle wearer. In principle, the correct alignment and positioning is required in all spectacle lenses. The correct alignment and positioning of the spectacle lenses has particular importance in the case of, in particular, individualized optical spectacle lens designs, toric spectacle lens design, spectacle lenses with a high dioptric power and in the case of progressive addition lenses. Progressive addition lenses allow spectacle wearers in-focus vision in different use situations, e.g., at different distances, by changing the line of sight only, without this requiring a relatively large accommodation success of the eyes in the process. Pursuant to DIN EN ISO 13666:2013-10, paragraph 8.3.5, progressive addition lenses are lenses with at least one progressive surface, that provide increasing (positive) dioptric addition power as the wearer looks down. Individualized spectacle lenses and/or progressive addition lenses have one or more reference points, e.g., a distance visual point and a near visual point, the relative position of which, depending on the use situation, must be adapted to the location of the pupils of the eyes of a spectacle wearer. Pursuant to DIN EN ISO 13666:2013-10, paragraph 5.16, the distance visual point is the assumed position of the visual point on a lens, which is used for distance vision under given conditions. Pursuant to DIN EN ISO 13666:2013-10, paragraph 5.17, the near visual point is the assumed position of the visual point on a lens, which is used for near vision under given conditions. In the case of the toric spectacle lens designs, there moreover is the need for the correct orientation of their cylindrical power for a spectacle wearer.

WO 2016/207412 A1 has disclosed an apparatus and a method of the type set forth at the outset. It describes the measurement of the local refractive power of a left and/or right spectacle lens in a spectacle frame using a measuring apparatus in which the spectacle frame is arranged. This measuring apparatus contains an image capture device and display for displaying a test structure, the relative position of which is known relative to the image capture device. The test structure displayed on the display is captured by means of the image capture device using an imaging beam path which passes through the left and/or the right spectacle lens in the spectacle frame. Additionally, a portion of the spectacle frame which defines the coordinate system of the spectacle frame is captured by means of the display. Then, the local refractive power of the left and/or right spectacle lens is in a computer unit determined by means of image processing in a coordinate system that is referenced to the coordinate system of the spectacle lens from the captured portion of the spectacle frame and the captured image representation of the test structure and from the coordinates of the test structure and the captured image representation of the test structure.

EP 2 608 109 A1 discloses a method for ascertaining the refractive power of a spectacle lens in the worn position. Here, a recording of the spectacle wearer without a spectacle frame and a recording of the spectacle wearer with a spectacle frame are captured and the size of the iris is ascertained in both recordings. The refractive power of the spectacle lens is deduced from the difference in size and the focal length of the camera.

WO 2016/076530 A1 has likewise disclosed a method for measuring the refractive power of a pair of spectacles, in which the refractive power of the lens is deduced from the size difference of an object between a recording without spectacle lens and a recording through the spectacle lens. However, these methods do not allow a local determination of the refractive power at individual points of the spectacle lens or the determination of the individual beam paths through the spectacle lens.

U.S. 2015/0029323 A1 has described a method which deduces the refractive power of the spectacle lens on the basis of the position of the facial contour which is captured once without the spectacle frame and once through the spectacle lens.

Particularly in the case of spectacles with progressive addition lenses, there is interest in accurately knowing the power thereof, the latter depending on the precise relative position of the left or right spectacle lens on the head of the spectacle wearer. This power can only be estimated but not determined using measuring apparatuses that serve to measure spectacles with spectacle lenses which are held in a holding apparatus since, in this case, the accurate relative position of the left or right spectacle lens on the head of the spectacle wearer and/or the position of the left or right spectacle lens in relation to the eye's center of rotation must be assumed.

SUMMARY

It is an object of the disclosure to measure, easily and without great complexity in terms of equipment, the focusing or the dioptric power of the left and/or right spectacle lens in a spectacle frame in the worn position on the head of the spectacle wearer, for example for distance vision and/or near vision.

This object is achieved by measuring the local refractive power and/or the refractive power distribution including capturing at least two images of an eye of a spectacle wearer from different recording positions. Advantageous developments of the disclosure are discussed below.

The disclosure is based on the concept that, particularly using a mobile terminal that has at least one image capture device, for example a smartphone or camera, which is held in the spectacle wearer's hand, it is possible to capture image representations of the head, typically of the face, of the spectacle wearer which show image representations of at least their eyes recorded for different lines of sight through a left or right spectacle lens, the image representations can be used to measure or determine the local refractive power of the left and/or right spectacle lens and/or specify a refractive power distribution for the left and/or right spectacle lens if the shape or size of an anterior eye portion of the left and/or right eye of the spectacle wearer and the relative position of the pair of spectacles worn by the spectacle wearer on their head, typically on their face, is known, the pair of spectacles not slipping when capturing different image representations, and the captured image representations show the left and/or right spectacle lens with a line of sight that points to respective recording position. A line of sight that points to a respective recording position typically is understood to mean the fixation of any stationary point on the image capture device.

Each image representation of the head, typically of the face, of the spectacle wearer which shows an image representation of at least their eyes recorded for a line of sight through a left and/or right spectacle lens can be used to determine the local refractive power of the left and/or right spectacle lens for this line of sight if the shape or size of an anterior eye portion of the left and/or right eye of the spectacle wearer and the relative position of the pair of spectacles worn by the spectacle wearer on the head, typically on their face, is known, the pair of spectacles not slipping when capturing different image representations, and the captured image representation shows the left and/or right spectacle lens with a line of sight that points to respective recording position.

At least two image representations of the head, typically of the face, of the spectacle wearer which show at least two image representations of at least their eyes in each case recorded for a line of sight through a left and/or right spectacle lens can be used to determine the refractive power distribution of the left and/or right spectacle lens depending on the respective line of sight if the shape or size of an anterior eye portion of the left and/or right eye of the spectacle wearer and the relative position of the pair of spectacles worn by the spectacle wearer on the head, typically on their face, is known, the pair of spectacles not slipping when capturing different image representations, and the captured at least two image representations each show the left and/or right spectacle lens with a line of sight that points to respective recording position.

This disclosure understands the term refractive power to mean the focal power or the dioptric power of a spectacle lens. In accordance with the definition specified in DIN EN ISO 13666:2013-10, paragraph 9.2, this disclosure understands the term focal power to be the general term comprising the spherical and astigmatic vertex powers of a spectacle lens. In accordance with the definition specified in DIN EN ISO 13666:2013-10, paragraph 9.3, this disclosure understands the term dioptric power of a spectacle lens to be the general term comprising the focal power and the prismatic power of a spectacle lens. In accordance with the definition specified in DIN EN ISO 13666:2013-10, paragraph 10.9, this disclosure understands the term prismatic effect of a spectacle lens to be the collective name for the prismatic deviation and base setting.

This disclosure understands the term local refractive power to mean the local focal power or the local dioptric power of a spectacle lens.

This disclosure understands the term refractive power distribution to mean the spatially resolved focal power or the spatially resolved dioptric power of a spectacle lens.

A mobile terminal should typically be understood to mean an apparatus which comprises at least one programmable processor and at least one image capture device, for example at least one camera, and at least one accelerometer, and which is typically designed to be worn, i.e., designed in terms of dimensions and weight such that it is portable by one person. Further components can be present in the mobile terminal, for example at least one screen, at least one light source for, e.g., visible light from a wavelength range of 380 nm to 780 nm and/or infrared light from a wavelength range of 780 nm to 1 mm and/or at least one light receiver with a sensitivity to, e.g., visible light from a wavelength range from 380 nm to 780 nm and/or infrared light from a wavelength range from >780 nm to 1 mm. Typical examples of such mobile terminals are smartphones or tablet PCs, which may comprise at least one screen, for example a sensor screen (touchscreen), at least one image capture device, for example at least one camera, at least one accelerometer, at least one light source, at least one light receiver and further components such as wireless interfaces for mobile radio and WLAN (wireless LAN).

In an exemplary embodiment of a method for measuring the local refractive power and/or the refractive power distribution of a left and/or a right spectacle lens in a spectacle frame in the worn position on the head, typically in the face, of a spectacle wearer, at least two first image representations are recorded from different recording positions relative to the head in a first step. To determine the local refractive power and/or the refractive power distribution on the left spectacle lens, these at least two first image representations in each case contain an image of at least i) an anterior eye portion of a left eye or ii) an anterior eye portion of a left eye and a part of the face or iii) an anterior eye portion of a left eye and a part of the face with the spectacle frame in the worn position, in each case with at least two spaced apart structure points therein, wherein the left eye in each case has a line of sight that points to the recording position and wherein the imaging beam paths that image the at least two structure points pass through the left spectacle lens. To determine the local refractive power and/or the refractive power distribution on the right spectacle lens, the at least two first image representations in each case contain an image of at least i) an anterior eye portion of a right eye or ii) an anterior eye portion of a right eye and a part of the face or iii) an anterior eye portion of a right eye and a part of the face with the spectacle frame in the worn position, in each case with at least two spaced apart structure points therein, wherein the right eye in each case has a line of sight that points to the recording position and wherein the imaging beam paths that image the at least two structure points pass through the right spectacle lens. The at least two first image representations can contain the left spectacle lens and at least i) an anterior eye portion of a left eye or ii) an anterior eye portion of a left eye and a part of the face or iii) an anterior eye portion of a left eye and a part of the face with the spectacle frame in the worn position, and the right spectacle lens and at least i) an anterior eye portion of a right eye or ii) an anterior eye portion of a right eye and a part of the face or iii) an anterior eye portion of a right eye and a part of the face with the spectacle frame in the worn position. Alternatively, the at least two first image representations can contain either a) the left spectacle lens and at least i) an anterior eye portion of a left eye or ii) an anterior eye portion of a left eye and a part of the face or iii) an anterior eye portion of a left eye and a part of the face with the spectacle frame in the worn position or b) the right spectacle lens and at least i) an anterior eye portion of a right eye or ii) an anterior eye portion of a right eye and a part of the face or iii) an anterior eye portion of a right eye and a part of the face with the spectacle frame in the worn position. Typically, the at least two first image representations contain the left spectacle lens and at least i) an anterior eye portion of a left eye or ii) an anterior eye portion of a left eye and a part of the face or iii) an anterior eye portion of a left eye and a part of the face with the spectacle frame in the worn position, and the right spectacle lens and at least i) an anterior eye portion of a right eye or ii) an anterior eye portion of a right eye and a part of the face or iii) an anterior eye portion of a right eye and a part of the face with the spectacle frame in the worn position. Furthermore typically, the at least two first image representations are used to determine the local refractive power and/or the refractive power distribution on the left and on the right spectacle lens.

The disclosure understands a spectacle frame in the worn position on the head, typically in the face, of a spectacle wearer to mean the adjusted position, as adjusted by an optician for example, and/or the correct seat of the spectacle frame in the face. Ideally, the spectacle frame does not slip in the worn position on the head, typically the face, of a spectacle wearer.

It should be observed that the anterior eye portion of an eye contains, in particular, the conjunctiva, the cornea, the sclera, the iris, the ciliary body, the epithelium of the iris and of the ciliary body, the anterior and posterior chamber of the eye, the lens and the pupil. The image representations, i.e., both the at least two first image representations and the at least two second image representations, need not necessarily comprise all of the aforementioned constituent parts of the anterior eye portion. The position of the eyes in the face and the line of sight are captured by the additional imaging of at least a part of the face and/or at least a part of the face with the spectacle frame in the worn position. The image representations of the anterior eye portion typically comprise at least the pupil, further typically at least the pupil and the iris.

An exemplary embodiment of the method for measuring the local refractive power and/or the refractive power distribution of a left and/or a right spectacle lens in a spectacle frame in the worn position on the head of a spectacle wearer contains a step of capturing at least one first image representation from different recording positions relative to the head, wherein the at least one first image representation contains an image of an anterior eye portion of the left eye with at least two spaced apart structure points therein, wherein the left eye in each case has a line of sight that points to the recording position and wherein an imaging beam path that images the at least two structure points passes through the left spectacle lens, and/or alternatively contains an image of an anterior eye portion of a right eye with at least two spaced apart structure points therein, wherein the right eye in each case has a line of sight that points to the recording position and wherein an imaging beam path that images the at least two structure points passes through the right spectacle lens. Further, the method contains a step of capturing at least two second image representations from different recording positions relative to the head, wherein the at least two second image representations each contain an image of the at least two spaced apart structure points of the anterior eye portion of the left eye without the left spectacle lens of the spectacle frame or with the left spectacle lens, wherein the imaging beam path underlying the image of the at least two structure points of the anterior eye portion of the left eye passes neither through the left nor the right spectacle lens in the spectacle frame during the capture, and/or alternatively contains an image of the at least two structure points of the anterior eye portion of the right eye without the right spectacle lens of the spectacle frame or with the right spectacle lens, wherein the imaging beam path underlying the image of the at least two structure points of the anterior eye portion of the right eye passes neither through the left or the right spectacle lens in the spectacle frame during the capture. In a further step, spectacle frame information data containing information from the group of position, relative position, shape and coordinates of the spectacle frame from at least two image representations containing an identical portion of the spectacle frame from the group of the at least one first image representation and the at least two second image representations are calculated in a coordinate system that is referenced to a coordinate system which is stationary with respect to the head of the spectacle wearer, by means of image evaluation with triangulation. The method further contains a step of calculating the coordinates of the at least two structure points of the anterior eye portion of the left eye and/or the at least two structure points of the anterior eye portion of the right eye from the at least two second image representations in a coordinate system that is referenced to a coordinate system which is stationary with respect to the head of the spectacle wearer, by means of image evaluation with triangulation. In a further step the visual point through the left spectacle lens is determined from at least one of the at least one first image representation, in each case from a center of an image structure determined from the image of an anterior eye portion of the left eye by means of image evaluation from the group of pupil image, iris image and the spectacle frame information data, and/or the visual point through the right spectacle lens is determined from at least one of the at least one first image representation, in each case from a center of an image structure determined from the image of an anterior eye portion of the right eye by means of image evaluation from the group of pupil image, iris image and the spectacle frame information data. Finally, a local dioptric power of the left spectacle lens is determined at the visual point, wherein the local refractive power $k(x,y)$ of the left spectacle lens is determined at the visual point from the coordinates of the at least two structure points of the anterior eye portion of the left eye calculated from the at least two second image representations and from an image of these at least two structure points in an image representation of the at least one first image representation; and/or a local dioptric power of the right spectacle lens is determined at the visual point, within the scope of which the local refractive power $k(x,y)$ of the right spectacle lens is determined at the visual point from the coordinates of the at least two structure points of the anterior eye portion of the right eye calculated from the at least two second image representations and from an image of these at least two structure points in an image representation from the group of the at least two first image representations.

In the present case, a structure point i) of an anterior eye portion or ii) of an anterior eye portion and a part of the face or iii) of an anterior eye portion and of a part of the face with the spectacle frame in the worn position is in each case understood to mean a geometric point of a structure, the image of which is clearly identifiable, in particular on account of a brightness and/or color that differs from the structure surrounding, in at least one image representation or recording of the object, typically of the head, further typically of the face, of a spectacle wearer by capturing the scene, typically i) of an anterior eye portion or ii) of an anterior eye portion and a part of the face or iii) an anterior eye portion and a part of the face with the spectacle frame in the worn position, in each case using at least one image capture device.

In the present case, a structure point of an i) anterior eye portion or ii) an anterior eye portion and a part of the face or iii) an anterior eye portion and a part of the face with the spectacle frame in the worn position can be, e.g., a point on a corner or an edge or on the boundary of a structure or within the structure itself in the form of a fine structure of the iris, the sclera or the lens.

The disclosure understands at least two spaced apart structure points to be a plurality of structure points, of which any two have a spatial distance from one another. The disclosure understands at least two spaced apart structure points to be, in particular, at least two structure points which have a spatial distance from one another.

In the present case, an imaging beam path for a structure point or an imaging beam path that images a structure point is understood to mean in each case the course of the light beams which bring about optical imaging of the structure point from the scene, typically an anterior eye portion or ii) an anterior eye portion and a part of the face or iii) an anterior eye portion and a part of the face with the spectacle frame in the worn position, in each case as a structure point image, into the image representation of the scene, typically i) an anterior eye portion or ii) an anterior eye portion and a part of the face or iii) an anterior eye portion and a part of the face with the spectacle frame in the worn position, in each case in at least one image capture device. As a result, an optical axis forming an axis of symmetry is referred to as the chief ray of the imaging beam path for a structure point.

The disclosure understands the line of sight of an eye to mean the direction of a vector passing through the center of the pupil, which starts at the eye rotation point, which forms the center of the eyeball, about which the eye can rotate to observe objects arranged in different directions without having to alter the posture of the head to this end.

In a further step which, in particular, can be before or after the first step in time but which may also be implemented simultaneously in certain circumstances, at least two second image representations are captured from different recording positions relative to the head, typically to the face, of the spectacle wearer. In this case, these at least two second image representations typically capture the same at least two structure points as the at least two first image representations. These at least two second image representations are recorded without a spectacle lens. To determine the local refractive power and/or the refractive power distribution at the left spectacle lens, these at least two second image representations each contain an image of the typically identical, at least two spaced apart structure points of the anterior eye portion of the left eye, wherein the imaging beam paths underlying the image of these at least two structure points pass neither through the left nor the right spectacle lens in the spectacle frame during the capture. To determine the local refractive power and/or the refractive power distribution at the right spectacle lens, these second image representations each contain an image of the typically identical, at least two structure points of the anterior eye portion of the right eye, wherein the imaging beam paths underlying the image of these at least two structure points pass neither through the left nor the right spectacle lens in the spectacle frame during the capture. To be able to achieve this, the at least two second image representations can be recorded without the left and/or the right spectacle lens in the spectacle frame or without the spectacle frame containing the left and/or the right spectacle lens. Alternatively, the recordings, i.e., the at least two second image representations, can also be recorded from different recording positions with a left and/or right spectacle lens in the spectacle frame such that the imaging beam paths to the at least two, typically identical structure points run past the spectacle lenses.

The terms "first" and "second" in relation to the image representations only refer to whether the at least two structure points of the respective image representation were captured with or without spectacle lens and not necessarily to the sequence in which the image representations are captured. The at least two structure points are captured with a spectacle lens in each first image representation and without a spectacle lens in each second image representation. The at least two structure points are typically identical in the first and in the second image representation. The first image representation with the spectacle lens can be captured before or after the second image representation without the spectacle lens.

Moreover, spectacle frame information data are calculated by means of image evaluation, typically by means of triangulation, in one step from at least two image representations containing an identical portion of the spectacle frame, from the group of the at least two first image representations and the at least two second image representations, in a coordinate system that is referenced to a coordinate system which is stationary with respect to the head, typically the face, of the spectacle wearer. Alternatively, the spectacle frame information data can be calculated by means of image evaluation, typically by means of triangulation, only from at least two second image representations containing an identical portion of the spectacle frame, in a coordinate system that is referenced to a coordinate system which is stationary with respect to the head, typically the face, of the spectacle wearer. These spectacle frame information data comprise information from the group containing the shape of the spectacle frame, the coordinates of the points of the spectacle frame in space relative to a coordinate system, and the position and relative position of a representative point of the spectacle frame, for example the centroid or the center of the bridge, relative to at least one image capture device or to the head.

Then, in a further step, coordinates of the at least two structure points of the i) anterior eye portion of the left eye) or the ii) anterior eye portion of the left eye and a part of the face or the iii) anterior eye portion of the left eye and a part of the face with the spectacle frame in the worn position and/or at least two structure points of the i) anterior eye portion of the right eye or the ii) anterior eye portion and a part of the face or the iii) anterior eye portion and a part of the face with the spectacle frame in the worn position, are determined in each case from the at least two second image representations in a coordinate system that is referenced to a coordinate system which is stationary with respect to the head, typically the face, of the spectacle wearer, by means of image evaluation, typically by means of triangulation.

The disclosure understands the coordinates of a point to mean a three-dimensional vector which specifies the relative position of the point in space in relation to the origin of a coordinate system with three spatial axes.

The coordinate system which is stationary with respect to the spectacle frame denotes a coordinate system that is always at the same location relative to the spectacle frame. By way of example, the coordinate system can be defined on the basis of a portion of the spectacle frame, on the basis of a point and/or an axis of the head, on the basis of extrinsic parameters of at least one image capture device in space or on the basis of a coordinate system in space chosen as desired in any other way.

In this case, two coordinate systems referenced to one another are understood to mean coordinate systems for which the coordinates of a point or a vector in one coordinate system are known in the other coordinate system.

It should be observed that this image evaluation can be implemented in a computer unit in particular, but that, in principle, it is also possible that this image evaluation can be implemented by a person who is applying the method for measuring the local refractive power and/or the refractive power distribution of a left and/or a right spectacle lens.

It should also be observed that the determination of coordinates relating to a structure point in a coordinate system that is referenced to a coordinate system which is stationary with respect to the head, typically the face, of the spectacle wearer requires the capture of at least two image representations of the structure point from different recording positions, with the imaging beam paths for the structure point not being allowed to pass either through the right or through the left spectacle lens.

The image evaluation of each first and second image representation typically comprises image processing technologies, for example classification, segmentation and triangulation. With the aid of methods for object recognition, such as segmentation and classification, each first and each second image representation is typically examined for objects of the classes of head, face, spectacle frame and/or anterior eye portion, in particular eye, iris and pupil. The methods for object recognition can have both conventional character, for example thresholding, edge- or region-based segmentation, optical flow, and learning character. If the methods for object recognition and/or segmentation have learning character, as in the case of the application of learning algorithms, it is necessary to train a neural network with augmented training data in preliminary steps. The result of each of these methods for object recognition and/or segmentation is the position, relative position and boundary of the objects, in this case the classes of head, face, spectacle frame, anterior eye portion, in particular eye, Iris and pupil. Additional information is found in the existence of the respective objects in the respective image representations. By way of example, in this way it is possible to recognize whether or not a spectacle frame and/or a spectacle lens is present in the image representation. Accordingly, the assignment as to whether this is a first or second image representation can also be carried out after the respective recording thereof. The assignment as to whether this is a first or second image representation can still be made without knowledge as to whether this was a first or second recording.

In a further exemplary embodiment, at least one first image representation of the head, typically of the face, of the spectacle wearer can be captured from at least one recording position for the purposes of measuring the local refractive power and/or refractive power distribution of a left and/or a right spectacle lens in the spectacle frame in the worn position on the head, typically in the face, of the spectacle wearer. To determine the local refractive power and/or the refractive power distribution on the left spectacle lens, this at least one first image representation in each case contains an image of at least i) an anterior eye portion of a left eye or ii) an anterior eye portion of a left eye and a part of the face or iii) an anterior eye portion of a left eye and a part of the face with the spectacle frame in the worn position, in each case with at least two spaced apart structure points therein, wherein the left eye in each case has a line of sight that points to the recording position and wherein the imaging beam paths that image the at least two structure points pass through the left spectacle lens. The determination of the local refractive power and/or the refractive power distribution on the right spectacle lens is implemented by means of the at least one first image representation in accordance with the above-described determination of the local refractive power and/or the refractive power distribution on the left spectacle lens. Furthermore, at least two second image representations from different recording positions relative to the head, typically to the face, of the spectacle wearer are captured in this exemplary embodiment. In terms of time, these at least two second image representations can be captured before or after or at the same time as the at least one first image representation. In this case, these at least two second image representations capture the typically identical at least two structure points as the at least two first image representations. These at least two second image representations are recorded without a spectacle lens. To determine the local refractive power and/or the refractive power distribution at the left spectacle lens, these at least two second image representations each contain an image of the typically identical, at least two spaced apart structure points of the anterior eye portion of the left eye, wherein the imaging beam paths underlying the image of these at least two structure points pass neither through the left nor the right spectacle lens in the spectacle frame during the capture. The determination of the local refractive power and/or the refractive power distribution on the right spectacle lens is implemented by means of the at least two second image representations in accordance with the above-described determination of the local refractive power and/or the refractive power distribution on the left spectacle lens. To capture the at least two second image representations, these can be recorded without the left and/or the right spectacle lens in the spectacle frame or without the spectacle frame containing the left and/or the right spectacle lens. Alternatively, at least two second image representations can also be recorded from different recording positions with a left and/or right spectacle lens in the spectacle frame such that the imaging beam paths to the at least two, typically identical structure points run past the spectacle lenses.

The more first image representations and/or the more second image representations are captured, the more accurately it is possible to determine the local refractive index at each visual point of the spectacle lens or the refractive power distribution of the spectacle lens.

In the methods disclosed herein, the local refractive power of the left and/or right spectacle lens is determined in each case at a visual point of the left and/or right spectacle lens, through which the left eye or the right eye of the spectacle wearer gazes with a viewing direction pointing to the respective recording position when capturing a first image representation, typically at least one first image representation, further typically when capturing at least two first image representations.

The visual point in the left spectacle lens in at least one first image representation, typically in at least two first image representations, is determined in each case from a center of an image structure from the group of pupil image, iris image ascertained in each case by means of image evaluation, typically by means of triangulation, from the image of i) an anterior eye portion of the left eye or ii) an anterior eye portion of the left eye and a part of the face or iii) an anterior eye portion of the left eye and a part of the face with the spectacle lens in the worn position, and the spectacle frame information data. The visual point in the right spectacle lens is determined accordingly from at least one first image representation, typically in at least two first image representations, in each case from a center of an image structure from the group of pupil image, iris image ascertained by means of image evaluation, typically by means of triangulation from the image of i) an anterior eye portion of the right eye or ii) an anterior eye portion of the right eye and a part of the face or iii) an anterior eye portion of the right eye and a part of the face with the spectacle lens in the worn position, and the spectacle frame information data.

Here, the image structure can be, e.g., a pupil image, which is an image representation of the pupil of the left or right eye. However, the image structure can also be an iris image, i.e., an image representation of the iris of the left or right eye. The center of this image structure is then determined from the corresponding image of i) an anterior eye portion of the left or right eye or ii) an anterior eye portion of the left or right eye and a part of the face or iii) anterior eye portion of the left or right eye and a part of the face with the spectacle frame in the worn position, in each case by means of image evaluation, typically by means of triangulation.

In particular, the visual point of a left or right spectacle lens can then be calculated as follows: First, the center of the image structure, e.g., the pupil center, is determined in the at least one first image representation, typically at least two first image representations, on the basis of an algorithm or else by way of manual annotations in the respective first image representation by a user. For the pupil center in the image plane, the chief ray of the imaging beam belonging to this point is thereupon calculated on the basis of intrinsic and extrinsic parameters of the at least one image capture device. Using the spectacle frame information data, the location at which the chief ray is refracted by the left or right spectacle lens can be calculated as point of intersection of the chief ray with the left or right spectacle lens. Then, this point of intersection corresponds to the visual point on the left or right spectacle lens.

Finally, the coordinates calculated from the at least two second image representations of the at least two structure points of the i) anterior eye portion of the left or right eye or of the ii) anterior eye portion of the left or right eye and a part of the face or of the iii) anterior eye portion of the left or right eye and a part of the face with the spectacle frame in the worn position and the image of these at least two structure points in an image representation from the group of the at least one first image representation, typically of the at least two first image representations, are used to determine the local refractive power of the left or right spectacle lens at the visual point. The at least two structure points of the at least one first image representation, typically of the at least two first image representations, and of the at least two second image representations are typically identical.

One concept of the disclosure is to ascertain the local refractive power and/or the refractive power distribution of the left and/or right spectacle lens from a comparison of the sizes of structures, e.g., the iris, in the i) anterior eye portion of the left or right eye or in the ii) anterior eye portion of the left or right eye and a part of the face or in the iii) anterior eye portion of the left or right eye and a part of the face with the spectacle frame in the worn position. In this case, the disclosure exploits the fact that the real sizes of corresponding structures are defined by the distances of the structure points calculated from the at least two second image representations. In particular, the local refractive power of the left and/or right spectacle lens is determined at the respective visual point on the left and/or right spectacle lens. The refractive power distribution of the left and/or right spectacle lens is obtained from the totality of the local refractive power at the respective visual points.

In particular, one concept of the disclosure is that the apparent sizes of the structures can be determined as follows during the observation through the left or right spectacle lens: for the at least two structure points of the i) anterior eye portion of the left or right eye or of the ii) anterior eye portion of the left or right eye and a part of the face or of the iii) anterior eye portion of the left or right eye and a part of the face with the spectacle frame in the worn position, each of the associated images of the at least two structure points are initially detected in the at least one first image representation, typically in the at least two first image representations. The chief rays are calculated for these images from the intrinsic and extrinsic parameters of the at least one image capture device. Subsequently, the points of intersection of the chief rays with the left or right spectacle lens are determined on the basis of the spectacle frame information data. Furthermore, the respective distance of the corneal apex of the left and/or right eye from the respective back surface of the left and/or right spectacle lens at the respective visual point can be determined from these points of intersection. Pursuant to DIN EN ISO 13666:2013-10, paragraph 5.9, the back surface of the spectacle lens is that surface of the spectacle lens intended to be fitted nearer to the eye. The distances of these points of intersection then yield the apparent sizes of the structures during the observation through the left or right spectacle lens. Then, the local refractive power and/or the refractive power distribution of the left or right spectacle lens can be deduced in each case from the ratio in relation to one another of the real and apparent sizes of the structures of the i) anterior left or right eye portion or of the ii) anterior left or right eye portion and a part of the face or of the iii) anterior left or right eye portion and a part of the face with the spectacle frame in the worn position.

Then, in the methods disclosed herein, the local refractive power $k(x,y)$ of the left spectacle lens is determined at the visual point $(x,y)$ from the coordinates of the at least two structure points of the i) anterior eye portion of the left eye or the ii) anterior eye portion of the left eye and a part of the face or the iii) anterior eye portion of the left eye and a part of the face with the spectacle frame in the worn position calculated from the at least two second image representations and from an image of these, typically identical, at least two structure points in an image representation from the group of the at least one first image representation, typically of at least two first image representations, and/or the local refractive power $k(x,y)$ of the right spectacle lens is determined at the visual point $(x,y)$ from the coordinates of the at least two structure points of the i) anterior eye portion of the right eye or the ii) anterior eye portion of the right eye and a part of the face or the iii) anterior eye portion of the right eye and a part of the face with the spectacle frame in the worn position calculated from the at least two second image representations and from an image of these, typically identical, at least two structure points in an image representation from the group of the at least one first image representation, typically of the at least two first image representations.

In addition to the determination of the local focal power of the left spectacle lens and/or the right spectacle lens at the visual point, the local prismatic effect and hence local dioptric power is determined that the visual point in an advantageous development of the disclosure. The latter is ascertained on the basis of the coordinates of an eye rotation point of the left and/or right eye in a coordinate system that is referenced to a coordinate system which is stationary with respect to the head of the spectacle wearer, typically to a coordinate system which is stationary with respect to the face of the spectacle wearer.

What is exploited here is that the prismatic effect of the left or right spectacle lens can be determined from the deflection of the chief ray to the pupil of the left or right eye in a first image representation, typically at least in one first image representation, further typically in at least two first image representations, at the left or right spectacle lens. This is because this chief ray extends along an assumed line of sight from the eye rotation point of the left or right eye through the center of the pupil of the left or right eye to the visual point of the left or right spectacle lens and, from there, to the image plane of the at least one image capture device. This chief ray is then calculated from the coordinates of the eye rotation point of the left or right eye and the visual point on the left or right spectacle lens, and from the intrinsic and extrinsic parameters of the at least one image capture device. In this case, the intrinsic parameters define in particular how the head, typically the face, of the spectacle wearer is imaged in the at least one image capture device. This typically contains the imaging scale and/or the distortion and/or the deformation. The intrinsic parameters typically furthermore define how a structure point located in the internal coordinate system of the at least one image capture device is mapped onto the coordinates of the pixels of the image representation. The extrinsic parameters define, in particular, the location and the relative position of the at least one image capture device. The extrinsic parameters of the at least one image capture device in particular comprise location and relative position of the coordinate system of the at least one image capture device relative to the coordinate system of the head, typically of the face, of the spectacle wearer.

Here, the coordinates of the eye rotation point of the left eye and/or of the eye rotation point of the right eye are calculated from an eye diameter $D_L$ assumed for the left eye and/or from an eye diameter $D_R$ assumed for the right eye, and from coordinates of at least one structure point of the head, typically of the face. To this end, the coordinates of the at least one structure point of the head, typically of the face, for example the tip of the nose, are determined from at least two image representations from the group of the at least one first image representation, typically the two first image representations, and the at least two second image representations. The coordinates of the at least one structure point of the head, typically of the face, are typically determined only from at least two image representations from the group of the at least two second image representations.

Taking into account anatomical knowledge about the relative position of the left eye and/or right eye on the head, typically in the face, for example relative to the calculated structure points of the head, typically of the face, is advantageous. The eye diameter $D_L$ or $D_R$ depends on the sex and age of the subject and is typically assumed to be a value in the range from 22 mm to 23 mm.

It is also advantageous to calculate the 3D geometry of the entire head from the at least two second image representations and the intrinsic and extrinsic parameters of the at least one image capture device since both the relative position of the spectacle frame relative to the head, typically relative to the face, and the position of the eye rotation point of the left and/or right eye can be determined as accurately as possible.

What should be observed is that the local prismatic effect can also be ascertained in the step of determining the local dioptric power of the left spectacle lens at the visual point (x,y) on the basis of an offset of the anterior eye portion in the image of the left eye as a matter of principle. A corresponding statement also applies to the determination of a local dioptric power of the right spectacle lens at the visual point (x,y).

An advantage of this method is that the spectacle wearer is put into a position where they can themselves measure their spectacle lenses in their spectacle frame in the worn position on the head, typically in the face, or themselves measure one of their spectacle lenses in their spectacle frame in the worn position on the head, typically in the face, in relation to the local refractive power and/or the refractive power distribution thereof. Consequently it is possible, for example, for them to make an online order for a second pair of spectacles. By way of example, the spectacle lenses can be single vision lenses in which, pursuant to DIN EN ISO 13666:2013-10, paragraph 8.3.1, only a single dioptric power is present according to design; and/or multifocal lenses in which, pursuant to DIN EN ISO 13666:2013-10, paragraph 8.3.2, two or more visibly divided portions of different focal powers are present according to design; and/or bifocal lenses, defined pursuant to DIN EN ISO 13666:2013-10, paragraph 8.3.3, as multifocal lenses with two portions, usually for distance and near vision; and/or trifocal lenses, defined pursuant to DIN EN ISO 13666:2013-10, paragraph 8.3.4, as multifocal lenses with three portions, usually for distance, intermediate and near vision; and/or progressive addition lenses, defined pursuant to DIN EN ISO 13666:2013-10, paragraph 8.3.5, as lenses with at least one progressive surface, that provide increasing (positive) addition power as the wearer looks down; and/or degressive-power lenses, defined in DIN EN ISO 13666:2013-10, paragraph 8.3.6, as lenses with at least one progressive surface, that provide decreasing power (i.e., a negative change of power) as the wearer looks up.

A further advantage of this method is that the spectacle wearer is put into a position where they can themselves measure their spectacles, typically their spectacle frame containing at least one spectacle lens, typically both spectacle lenses, in the worn position on the head, typically in the face, in respect of the centration parameters thereof. In this case, the centration parameters comprise at least one of the parameters set forth below:

the distances x of the respective visual points from the straight lines through the innermost points of the respective edge curve of the spectacle lens pursuant to DIN EN ISO 13666:2013-10, FIG. 12; and/or the distances y of the respective visual points from the straight lines through the lowermost points of the respective edge curve of the spectacle lens pursuant to DIN EN ISO 13666:2013-10, FIG. 12; and/or the horizontal boxed lens size a and the vertical boxed lens size b of a boxing system pursuant to DIN EN ISO 13666:2013-10, FIG. 12, typically including the edge curve; and/or the vertex distance, defined in DIN EN ISO 13666:2013-10, paragraph 5.27, as the distance between the back surface of the spectacle lens and the apex of the cornea, measured in the line of sight perpendicular to the plane of the spectacle front; and/or the plane of the lens shape, defined in DIN EN ISO 13666:2013-10, paragraph 17.1, as the plane tangential to the front surface of a plano or demonstration or dummy lens at its boxed center, when mounted in the frame; and/or the plane of the spectacle front, defined in DIN EN ISO 13666:2013-10, paragraph 17.2, as the plane containing the two vertical centerlines of the right and left boxed lens shapes; and/or the angle α between the planes of the lens shape, which are each set as a plane of the relevant spectacle lens, and the plane of the spectacle front pursuant to DIN EN ISO 13666:2013-10, FIG. 11; and/or the "as-worn" pantoscopic angle, defined in DIN EN ISO 13666:2013-10, paragraph 5.18, as the angle in the vertical plane between the normal to the front surface of a spectacle lens at its boxed center and the line of sight of the eye in the primary position, usually taken to be the horizontal.

Moreover, the method described herein can also be used to determine the distance of the corneal apex of the respective eye from the respective visual point of a line of sight through the respective spectacle lens. For each visual point, it is possible to determine the distance of the corneal apex of the respective eye from the back surface of the respective spectacle lens.

Typically, the edge curve is the shape-determining boundary of the spectacle lens which is located on the front surface of the spectacle frame distant from the face, and partly or wholly coincides with the inner edge of the spectacle frame lying on the front in the case of half rim or full rim spectacles. In the case of full rim spectacles, the edge curve on the front surface of the spectacle frame distant from the face is the same as the lens outer edge located on the front side or the frame inner edge located on the front side. In the case of half rim spectacles, the edge curve on the front surface of the spectacle frame distant from the face is the same as the lens outer edge located on the front side or the frame inner edge located on the front side, provided there is a structure provided by the frame. To the extent that there is no structure provided by the frame in the case of half rim spectacles, the edge curve is the same as the lens outer edge located on the front side in the front surface of the spectacle frame distant from the face. In the case of rimless spectacles, there is no analogous structure of the frame, i.e., the term edge curve here always denotes the lens outer edge located on the front side in the front surface of the spectacle frame distant from the face.

A further advantage of this method is that the spectacle wearer is put into a position where they can themselves determine their spectacles, typically their spectacle frame containing at least one, typically both of their spectacle lenses, in the worn position on the head, typically in the face, both in relation to the local refractive power and/or the refractive power distribution of at least one of their spectacle lenses and in relation to the aforementioned centration parameters of their spectacle frame in the worn position on the head, typically in their face. Knowledge of the centration parameters, in particular knowledge of the distance of the corneal apex from the back surface of the respective spectacle lens at each visual point allows the local refractive power and/or the refractive power distribution of the respective spectacle lens to be converted into a refraction value of the left and/or right eye (e.g., for the spherical correction, the cylindrical correction, the axis, in each case for distance and/or for near vision). Consequently, the refraction value of the right and/or left eye of the spectacle wearer is also ascertained indirectly by measuring the spectacle lens. Prismatic corrections are likewise determinable.

A further advantage of the method is that it is possible to obtain a combination of radii of curvature, surface topography and refractive index, which corresponds to the local refractive power and/or the refractive power distribution of the left and/or right spectacle lens. In addition thereto, it is additionally also possible to determine the edge curve of the respective spectacle lens.

When capturing the at least two second image representations from recording positions that differ in relation to the head, typically the face, of the spectacle wearer, it is advantageous if the spectacle wearer does not change the line of sight so that the coordinates of the at least two structure points of the i) left and/or right anterior eye portion or of the ii) left and/or right anterior eye portion and a part of the face or iii) of the left and/or right anterior eye portion and a part of the face with the spectacle frame in the worn position can be reliably determined in each case. Moreover, the line of sight of the spectacle wearer then is identical for all second recordings in this way, simplifying the method. The at least two structure points of the at least two second image representations typically are the same at least two structure points from the at least one first image representation or from the at least two first image representations.

However, what should be observed when capturing the at least two second image representations i) of an anterior eye portion of the left and/or right eye or ii) of an anterior eye portion of the left and/or right eye and a part of the face or iii) anterior eye portion of the left and/or right eye and a part of the face with the spectacle frame in the worn position is that the line of sight can also point to the respective recording position in each case. This is because the line of sight of the left or right eye to each second image representation can be determined from the eye rotation point of the left or right eye, the pupil center in the image representation and the intrinsic and extrinsic parameters of the image capture device and the movement of the at least two structure points of the i) front eye portion of the left or right eye or ii) the front eye portion of the left or right eye and a part of the face or iii) the front eye portion of the left or right eye and a part of the face with the spectacle frame in the worn position can be corrected in each case on the basis of this information.

Typically, the at least two second image representations are captured with any desired viewing direction. Thus, where the spectacle wearer gazes while the at least two second image representations are captured is irrelevant. The shape of the head and the eye rotation points can also be determined in the case of any line of sight of the at least two second image representations.

To facilitate a high accuracy of the calculations, it is likewise advantageous if the spectacle frame does not change its position and relative position on the head, typically in the face, of the spectacle wearer, i.e., that it does not slip during the recordings or the capture of the respective image representation.

To calculate spectacle frame information data it is possible to ascertain coordinates of the spectacle frame from the recordings with the spectacle frame on the basis of a 3-D reconstruction method or depth estimation method. In this case, the spectacle frame can contain spectacle lenses or be present without spectacle lenses. If no spectacle lenses are contained in the spectacle frame, the spectacle lenses within the spectacle frame can be approximated on the basis of simplified approximations, e.g., as planes or higher-order surfaces. A model of the spectacle frame, for example a CAD model, may also be available. This model can be fitted to the coordinates of the spectacle frame determined in advance, e.g., by means of the 3-D reconstruction or depth estimation method, in order to be able to determine the shape, position and relative position of the spectacle frame with greater accuracy.

3-D reconstruction methods and depth estimation methods are presented, for example, in the book "Multiple View Geometry" by R. Hartley and A. Zisserman, Cambridge University Press 2004, specifically in Chapter 10: "3D reconstruction of cameras and structure" and in Chapter 18: "N-view computational methods," reference being made thereto in full and the disclosure thereof being incorporated in the description of this disclosure.

To generate the spectacle frame information data it is advantageous if the spectacle frame was previously segmented in the at least one first image representation, typically in the at least two first image representations and in the at least two second image representations, which contain a spectacle frame. This facilitates a more accurate calculation of the coordinates of the spectacle frame and the position and relative position thereof in space, and additionally economizes computation time. The disclosure denotes the term segmentation to mean the generation of one or more regions that are cohesive in terms of content by combining adjacent pixels in accordance with a certain homogeneity criterion, for example according to semantic criteria. In this case, all pixels of the respective image representation that belong to an image of the spectacle frame are determined.

In the method specified above for measuring the local refractive power and/or the refractive power distribution of a left and/or a right spectacle lens, a multiplicity of structure points of the i) anterior eye portion of the left and/or right eye or ii) of the anterior eye portion of the left and/or right eye and a part of the face or iii) of the anterior eye portion of the left and/or right eye and a part of the face with the spectacle frame in the worn position are typically respectively captured in the first and the second image representations of the head, typically of the face, of the spectacle wearer from at least one recording position in each case, and the above-described method steps are carried out for this multiplicity of structure points. Typically, at least one first image representation and at least two second image representations of the head, typically of the face, of the spectacle wearer, particular typically at least two first image representations and at least two second image representations of the head, typically of the face, of the spectacle wearer are captured. The multiplicity of structure points of the at least one first image representation, typically of the at least two first image representations, are typically identical to the multiplicity of the structure points of the at least two second image representations. In this case, a multiplicity of structure points is presently understood to mean at least three, typically at least 10, further typically at least 100, particularly typically at least 1000 and very particular typically at least 10 000 structure points. In particular, a multiplicity of structure points ≥100 structure points and ≤1000 structure points is advantageous because this forms a good compromise between an accuracy of the measured local refractive powers and a required calculation outlay.

By virtue of the local refractive power being measured at a multiplicity of different points of the left and/or right spectacle lens, it is possible to measure or specify not only a local refractive power but also a refractive power distribution of a left and/or a right spectacle lens.

An exemplary embodiment of the disclosure provides for feature detection methods for detecting the images of suitable structure points and feature matching methods for detecting the image of corresponding structure points in the first and the second image representations, typically of the at least one first image representation and of the at least two second image representations, particularly typically of the at least two first image representations and the at least two second image representations, to be used for calculating the coordinates of the at least one structure point, typically the at least two structure points, respectively of the i) anterior eye portion of the left eye or of the ii) anterior eye portion of the left eye and a part of the face or of the iii) anterior eye portion of the left eye and a part of the face with the spectacle frame in the worn position and/or for calculating the coordinates of the at least one structure point of the i) anterior eye portion of the right eye or of the ii) anterior eye portion of the right eye and a part of the face or of the iii) anterior eye portion of the right eye and a part of the face with the spectacle lens in the worn position and/or for calculating the local refractive power and/or the refractive power distribution from the structure points of the first image representations.

Feature detection methods can be used to detect the images of suitable structure points. These detect characteristics in images which are prominent on account of their local surroundings and therefore easy to recognize. So-called features—feature vectors or feature descriptors—are calculated for a characteristic; these describe the characteristic as briefly and succinctly as possible. Examples of such methods are, e.g., gradient-based feature descriptors such as SIFT and SURF features or binary feature descriptors such as BRIEF, FAST, ORB or BRISK features. The use of a feature detection method is advantageous in that use is made of the images of particularly distinguishable structure points for the calculation of the coordinates of the structure points of the i) left and/or right eye portion or of the ii) left and/or right eye portion and in each case a part of the face or of the iii) left and/or right eye portion and in each case a part of the face with the spectacle frame, as a result of which the accuracy of the method is increased.

Feature matching methods are used to find candidates for a characteristic in other images, the candidates having a high probability of being image representations of the same characteristic. These methods are therefore able to find those images of structure points detected in the various first and further image representations which belong to the same structure point in space. Similarity measures that state the similarity between two features are defined to this end. By way of example, if a certain similarity threshold is exceeded, the associated features are classified as candidates for "matching," i.e., for an image representation of the same features. Since very many features are usually detected in the images, an efficient implementation of the similarity measures, for example by means of tree structures, is expedient in order to reduce the runtime. The use of a feature matching method is advantageous in that the detected features in the various recordings can be assigned to one another particularly efficiently and with a high accuracy, increasing the accuracy of the method and economizing computation time.

Feature detection methods and feature matching methods are described, for example, in the book "Visual Object Recognition" by K. Grauman and B. Laibe, Morgan & Claypool Publishers, 2011, pages 11 to 40, which is referred to herewith in full and the disclosure of which is incorporated in the description of this disclosure.

To be able to deduce the coordinates of the structure points from the instances of matching of the features in the various recordings or image representations, knowledge of intrinsic and extrinsic parameters of the at least one image capture device is necessary. By way of example, depth estimation or 3-D reconstruction methods can be used to calculate the coordinates.

To find fitting images of structure points of the i) anterior eye portion of the left and/or right eye or of the ii) anterior eye portion of the left and/or right eye and in each case a part of the face or of the iii) anterior eye portion of the left and/or right eye and in each case a part of the face with the spectacle frame in the worn position, it is advantageous if i) the anterior eye portion of the left and/or right eye or ii) the anterior eye portion of the left and/or right eye and in each case a part of the face or iii) the anterior eye portion of the left and/or right eye and in each case a part of the face with the spectacle frame in the worn position is segmented in the various first and second image representations. The search range for suitable structure points can thus be restricted to the segmented region of the i) anterior eye portion of the left and/or right eye or of the ii) anterior eye portion of the left and/or right eye and in each case a part of the face or of the iii) anterior eye portion of the left and/or right eye and in each case a part of the face with the spectacle frame in the worn position. This measure increases the accuracy of the method by virtue of false detections outside of the i) anterior eye portion or of the ii) anterior eye portion and a part of the face or of the iii) anterior eye portion and a part of the face with the spectacle frame in the worn position being avoided in each case, and additionally saves computing time since it is only necessary to search through the segmented region.

What should be observed is that the at least one first image representation, typically the at least two first image representations, and the at least two second image representations can be captured by means of at least one image capture device which is displaced relative to the head, typically the face, of the spectacle wearer by virtue of the image capture device and/or the head, typically the face, of the spectacle wearer being moved.

In this context, a plurality of alternatives are conceivable. Typically, the recordings are captured using a single displaceable image capture device which is moved along a trajectory in front of the head, typically the face, of the spectacle wearer. This has two advantages: Firstly, the recordings are then able to be captured in cost-effective manner with little operative outlay since a single image capture device is sufficient. Secondly, the recordings can in principle be captured by the spectacle wearer themselves at any location without requiring a trip to the optician, substantially simplifying the ordering process.

The at least one image capture device can be integrated, for example, into a hand-held apparatus, for example a smartphone or tablet computer or a camera. By way of example, it can be held by the spectacle wearer themselves or by any other person. It is advantageous if the hand-held apparatus comprises position sensors that provide position signals which can assist an alignment of the at least one image capture device on the head, typically the face, of the spectacle wearer. What should be observed is that it is also possible to use at least one stationary, immobile image capture device, relative to which the spectacle wearer moves their head, typically their face. This is advantageous in that it is also possible to produce relatively large, stationary measuring devices, for example for a shop, which devices comprise only one or at least one image capture device. This saves space, particularly if the at least two image capture devices capture the head, typically the face, from very different recording positions, and is cost-effective.

Finally, it is also conceivable to use a plurality of image capture devices, typically at least two image capture devices, for the image representations from different recording positions relative to the head, typically relative to the face. These either can be attached in stationary fashion at different positions in space or can be moved relative to the head, typically relative to the face, of the spectacle wearer along trajectories. The advantage of using a plurality of image capture devices, typically at least two image capture devices, further typically a multiplicity of image capture devices at different positions in space lies in a higher accuracy of the method since known relationships between the position and relative position of the image capture device simplify or even render superfluous the calculation of the extrinsic parameters of the image capture device, in particular the extrinsic camera parameters. In particular, the calculation of coordinates of structure points of the head, in particular of the i) anterior eye portion of the left and/or right eye or of the ii) anterior eye portion of the left and/or right eye and in each case a part of the face or of the iii) anterior eye portion of the left and/or right eye and in each case a part of the face with a worn spectacle frame, and of the coordinates of the spectacle frame becomes simpler and more robust as a result. Additionally, computation time is economized by the use of a plurality of image capture devices, typically at least two capture devices, since the calculation of the intrinsic and/or extrinsic parameters of the image capture devices can be implemented in preliminary steps of the method in the optimal case and consequently also needs to be carried out only once.

It is also conceivable to record a film or video sequence of the head, typically of the face, on the basis of one or more image capture devices, typically on the basis of at least two image capture devices, and/or when rotating the head, typically the face. This is advantageous in that a multiplicity of first and second image representations are available for multiplicity of different recording positions, which only deviate slightly from one another. As a result, the accuracy of the method can be improved.

The disclosure understands an image capture device to be a device for the digital capture of images. By way of example, an image capture device can be a constituent part of a digital camera. However, an image capture device within the meaning of the disclosure can for example also be a constituent part of a mobile terminal, such as a cellular telephone, a smartphone, or a tablet computer, a stereo camera, a plenoptic camera, or a multi-camera. An image capture device within the meaning of the disclosure has an image plane and typically contains an image sensor chip with at least one objective.

An apparatus according to the disclosure for measuring the local refractive power and/or the refractive power distribution of a left and/or right spectacle lens can be embodied, in particular, as a mobile terminal that contains a digital camera or a plurality of, at least two, digital cameras.

In particular, the following advantages arise by virtue of using a mobile terminal with at least two image capture devices, for example a smartphone with at least two digital cameras, a tablet computer with at least two digital cameras, two digital cameras with an image capture device in each case, a stereo camera with two image capture devices, a multi-camera with a plurality of image capture devices, a camera chip with at least two objectives or a plenoptic camera, for measuring the local refractive power and/or the refractive power distribution of a spectacle lens:

To determine the local refractive power and/or refractive power distribution of a right spectacle lens, it may be sufficient to capture with each image capture device a single first image representation of the head, typically of the face, with i) an anterior eye portion of a right eye or with ii) an anterior eye portion of a right eye and a part of the face or with iii) an anterior eye portion of a right eye and a part of the face with the spectacle lens in the worn position, in each case with at least one structure point therein, wherein the right eye has a line of sight pointing to the recording position and wherein an imaging beam path that images the at least one structure point passes through the right spectacle lens, and to capture with each image capture device a single second image representation of the head, typically of the face, with i) an anterior eye portion of a right eye or with ii) an anterior eye portion of a right eye and a part of the face or with iii) an anterior eye portion of a right eye and a part of the face with the spectacle lens in the worn position, in each case with at least one identical structure point therein, in each case without the right spectacle lens being in the spectacle frame or without the spectacle frame containing the right spectacle lens, wherein the imaging beam path respectively underlying the image of the at least one structure point of the i) anterior eye portion of the right eye or of the ii) anterior eye portion of the right eye and a part of the face or of the iii) anterior eye portion of the right eye and a part of the face with the spectacle lens in the worn position passes through neither the left nor the right spectacle lens in the spectacle frame during the capture. A corresponding statement applies to the determination of the local refractive power and/or refractive power distribution of a left spectacle lens. If at least two image capture devices are present, a line of sight that points to the recording position is understood to mean the fixation of any stationary point on the mobile terminal, the stereo camera, the multi-camera, of the camera chip or the plenoptic camera. When capturing the one single second image representation, the line of sight can be identical to, or different from, the line of sight when capturing the one single first image representation. The line of sight is typically identical. The reconstruction of the at least one structure point is also possible in the case of different lines of sight.

To increase the accuracy of the method for measuring a local refractive power and/or a refractive power distribution of a left and/or a right spectacle lens in a spectacle frame, at least two first such image representations and at least two second such image representations are typically created even if use is made of at least two image capture devices.

An exemplary embodiment of the disclosure provides for the capture of a multiplicity of, typically at least three, first image representations of the head, typically of the face, with i) a left and/or right anterior eye portion or ii) a left and/or right anterior eye portion and in each case a part of the face or iii) a left and/or right anterior eye portion and in each case a part of the face with the spectacle lens in the worn position, in each case including the left and/or right spectacle lens, the local refractive power and/or refractive power distribution of which is intended to be ascertained and which is typically located in a spectacle frame, and of a multiplicity of, typically at least three, second image representations of the head, typically of the face, with i) a left and/or right anterior eye portion or ii) a left and/or right anterior eye portion or/and in each case a part of the face or iii) a left and/or right anterior eye portion and in each case a part of the face with the spectacle frame in the worn position, in each case without the left and/or the right spectacle lens.

When recording the multiplicity of second image representations, typically when recording the at least three second image representations, the spectacle frame can be removed from the head, typically away from the face. For the purposes of capturing a multiplicity of, typically at least three, first image representations of the head of the spectacle wearer and a multiplicity of, typically at least three, second image representations of the head, typically of the face, of the spectacle wearer, it is advantageous if these span at least part of a hemisphere or a hemisphere, in each case around the head, or adopt a multiplicity of observation directions or observation distances, typically at least three observation directions observation distances.

By virtue of capturing a multiplicity of, typically at least three, image representations of the head, typically of the face, of the spectacle wearer with and without a spectacle frame and with and without spectacle lenses received therein, it is possible to increase the accuracy of the method for measuring the local refractive power and/or the refractive power distribution of a left and/or a right spectacle lens, typically in a spectacle frame.

By virtue of a multiplicity of image representations, typically at least three image representations, of the scene, typically of the i) anterior eye portion or of the ii) anterior eye portion and a part of the face or of the iii) anterior eye portion and a part of the face with the spectacle frame in the worn position being captured by means of at least one image capture device with a displacement of the at least one image capture device or with a rotation of the head, typically of the face, in the case of a stationary at least one image capture device, wherein the line of sight of the left eye and/or the right eye of the spectacle wearer points to the respective recording position and line of sight beam paths for different line of sight directions of the left eye and/or the right eye of the spectacle wearer of the spectacle frame through the left spectacle lens and/or the right spectacle lens are calculated from the multiplicity of, at least three, image representations captured in the process and a local refractive power $k(x,y)$ of the left spectacle lens and/or of the right spectacle lens is determined for each line of sight direction, it is possible to determine, for a line of sight of the spectacle wearer, the local refractive power and/or the refractive power distribution of the spectacle lenses in the spectacle frame worn by the spectacle wearer.

Measuring the local refractive power and/or refractive power distribution of a left and/or right spectacle lens in a spectacle frame allows statements to be made, in particular, about the so-called binocular effects of the pair of spectacles, i.e., a spectacle frame including both spectacle lenses. A binocular effect should be understood to mean the assessment of the dioptric or focal power of the left and right spectacle lens for a certain line of sight. The binocular effect can also comprise higher-order imaging aberrations of the spectacle lens, such as coma or else prismatic aberration.

Measuring the local refractive power and/or the refractive power distribution of a left and/or right spectacle lens in a spectacle frame allows identification as to whether, e.g., the astigmatic effect, comprising the difference of the refractive powers in the principal meridians and their directions, of the spectacle lens deviates significantly from the binocular target values in a certain line of sight. In this case, the binocular target values should be understood to mean the subjectively ascertained refraction of both eyes, comprising sphere, cylinder with axis and prism with base. The deviation from the binocular target values is not noticeable or only hardly noticeable by the spectacle wearer if, for example, the deviations of the astigmatic effect of the left and the right spectacle lens from the binocular target values are the same. However, this deviation from the binocular target values is clearly noticeable by the spectacle wearer if the deviations of the astigmatic effect of the left and the right spectacle lens from the binocular target values are different.

An incorrect prismatic effect between the right and left spectacle lens is very uncomfortable for a spectacle wearer. An incorrect nasal prismatic effect is more likely to be accepted by spectacle wearer than an incorrect temporal prismatic effect and/or an incorrect height prismatic effect. As a result of the simultaneous measurement of the right and left spectacle lens, the aforementioned method facilitates the determination of the deviation of the prismatic effect of the left and right spectacle lens from a binocular target value in the worn situation.

The disclosure is based, in particular, on the concept of the recording of a multiplicity of image representations, in particular the recording of a film or video sequence, by at least one image capture device from different recording positions and/or recording directions facilitates a calculation of extrinsic parameters of the image capture device and/or of coordinates of structure points of the head, typically of the face, by means of image processing, e.g., using SLAM algorithms, i.e., algorithms for simultaneous localization and mapping (Simultaneous Localization and Mapping) as described in the publication "A. Teichman et al., Unsupervised intrinsic calibration of depth sensors via SLAM, Robotics: Science and Systems 2013, Berlin Germany, Jun. 24-28, 2013," to which reference is made herewith in full and the disclosure of which is incorporated in the description of this disclosure.

From image representations of one and the same scene, in this case the head, typically the face, of the spectacle wearer, which are captured from different recording positions and which therefore show the scene from different perspectives, a SLAM algorithm facilitates in particular the calculation of both a three-dimensional geometry of the scene and the position of the at least one image capture device which the latter adopted in each case when capturing image representations of the scene. A SLAM algorithm comprises a feature detection routine which detects characteristics present in the scene, in this case for each structure point, and a feature matching routine, by means of which, for each characteristic in a recording, the corresponding characteristic is recognized in the images recorded from different recording positions. Then, on the basis of the intrinsic and extrinsic parameters of the at least one image capture device, a three-dimensional model of the scene is created from the corresponding positions of each characteristic in the image recordings.

The accuracy of such SLAM algorithms, in particular of a SLAM algorithm which calculates the extrinsic parameters of the at least one image capture device and/or the position of the structure points in the image representation, is determined by the accuracy of the calibration of the at least one image capture device. Such a calibration is able to assign to each pixel coordinate of the at least one image capture device a three-dimensional imaging beam path incident on the respective image capture device.

The disclosure understands a calibration of an image capture device to mean the ascertainment of the intrinsic and/or extrinsic parameters thereof.

The disclosure understands the intrinsic parameters of an image capture device to mean the focal length f, the coordinates of the image center $Z_x$ and $Z_y$, the shearing parameter s and the scaling parameters $m_x$ and $m_y$ on account of differently scaled coordinate axes in the image plane. Mathematically, the intrinsic parameters can be expressed as an intrinsic calibration operator $\overline{K}$:

$$\overline{K} = \begin{pmatrix} f \cdot m_x & s & Z_x \cdot m_x \\ 0 & f \cdot m_y & Z_y \cdot m_y \\ 0 & 0 & 1 \end{pmatrix}.$$

The intrinsic parameters can additionally also include distortion parameters that serve to determine image distortions, in particular the radial and tangential distortion. The intrinsic parameters describe how a coordinate in the coordinate system of an image capture device is mapped to the associated image plane or how the associated imaging beam path in the coordinate system of the image capture device can be calculated from a given point in the image plane.

The intrinsic parameters of the at least one image capture device, i.e., the camera calibration operator $\overline{K}$, can be determined for example from at least two image representations of a specific calibration pattern, e.g., a checkerboard pattern or a point pattern, by means of the at least one image capture device. As an alternative thereto, it is also possible to determine the intrinsic camera calibration operator $\overline{K}$ by evaluating a multiplicity of image representations of at least one scene directly from the multiplicity of image representations of the scene, which may be based on different recording positions. Thus, a SLAM algorithm can also be used to calculate intrinsic parameters of the image capture device. This is advantageous in that there is no need to carry out cumbersome calibration methods in order to determine these parameters before the use of the image capture device. Instead, this can also be directly estimated when carrying out the SLAM algorithm. This saves outlay and computation time.

The disclosure understands the extrinsic parameters of an image capture device to be the position and relative position of the image capture device in space relative to a fixed reference coordinate system. In this case, the position denotes the point in space in relation to the reference coordinate system at which the center of the image capture device is situated. The relative position denotes a rotation of the image capture device, once again in relation to the reference coordinate system. By way of example, the reference coordinate system can be specified by the position and relative position of an image capture device during one of the recordings, or else by a point on the head of the spectacle wearer together with an alignment, which may be determined by further points on the head, or by a point and a portion of the spectacle frame on the head.

Here, the relative position of an image capture device is described by a rotation operator $$\overline{R} = \begin{pmatrix} R_{11} & R_{12} & R_{13} \\ R_{21} & R_{22} & R_{23} \\ R_{31} & R_{32} & R_{33} \end{pmatrix}$$

where $det \, \overline{R} = 1,$ which defines the rotation of the image capture device about the camera center relative to the reference coordinate system. The position of an image capture device is described by a translation vector $$\vec{T} = \begin{pmatrix} t_1 \\ t_2 \\ t_3 \end{pmatrix},$$

which defines the displacement of the camera center relative to the origin of the reference coordinate system. A coordinate c in space is mapped on the corresponding point in the image plane of the image capture device by the mapping rule $$f(c) = \overline{K} \cdot (\overline{R} \cdot c + \vec{T})$$

and the calculation of the associated two-dimensional inhomogeneous coordinates by means of dividing the result vector by its third coordinate.

Conversely, for a coordinate y in homogeneous coordinates on the image plane of the image capture device, the associated imaging beam path can be determined on the basis of the mapping rule $$g(y) = \overline{R}^T \cdot (\overline{K}^{-1} \cdot y - \vec{T})$$

the associated imaging beam path being mapped onto this coordinate.

Intrinsic and extrinsic parameters of a image capture device, associated mapping rules and the calibration of image capture devices are explained in detail in the book "Multiple View Geometry" by R. Hartley and A. Zisserman, Cambridge University Press 2004, pages 153 to 193.

From the multiplicity of, typically at least three, image representations of the head, typically of the face, coordinates of the at least one structure point of the head, typically of the face, and of the spectacle frame and extrinsic parameters of the at least one image capture device are then determined for each captured image representation. Then, beam paths through the spectacle lenses are ascertained therefrom in order then to determine the local refractive power and/or the refractive power distribution of the left and/or right spectacle lens from the deflection of the beam paths through the left and/or right spectacle lens.

An advantageous development of the disclosure therefore provides for a SLAM algorithm to be used for calculating the coordinates of the structure points of the head, typically of the face, and/or extrinsic parameters of the at least one image capture device comprising the position and relative position in space thereof when capturing the at least one first, typically two first and/or at least two second image representations.

By using a SLAM algorithm, it is possible to ascertain the intrinsic and/or extrinsic parameters of the at least one image capture device and/or the coordinates of structure points of the head, typically of the face, with greater accuracy and also with less computation time. By way of example, the accuracy of the calculations can be increased by the use of "bundle adjustment" methods.

By means of the above-described calibration, the SLAM algorithm is capable of assigning to each image of a structure point in the second image representations a multiplicity of three-dimensional imaging beam paths incident in the respective image capture device, which imaging beam paths do not pass through a spectacle lens. From these, it is then possible to determine the coordinates of the structure points of the i) left and/or right anterior eye portion or ii) left and/or right anterior eye portion and in each case a part of the face or iii) left and/or right anterior eye portion and in each case a part of the face with the spectacle frame in the worn position, and/or of structure points of the rest of the head. A multiplicity of imaging beam paths which pass through the right and/or left spectacle lens at a location of refraction can be determined from the captured first image representations of the structure point, which were observed through the right and/or left spectacle lens by the at least one image capture device, and the coordinates calculated from the second recordings, which coordinates are each corrected on the basis of the recorded line of sight of the spectacle wearer in one first recording. The beam model spanned thus is typically used to ascertain the local refractive power or the refractive power distribution of the left and/or right spectacle lens.

The local refractive power or the refractive power distribution of the spectacle lenses for the spectacle wearer can be described as the derivative of the spatial beam deflections in the beam model. It is therefore possible to calculate a local gradient field from the deflection of the beam paths through the spectacle lens to determine the local refractive power in the vicinity of the location of the refraction of the spectacle lens.

An advantageous development of the disclosure therefore provides for the local refractive power of the left spectacle lens to be calculated from the derivative of a gradient field which is ascertained from the deflection of the imaging beam path for the image of the at least one structure point of the i) anterior eye portion of the left eye or ii) anterior eye portion of the left eye and in each case a part of the face or iii) anterior eye portion of the left eye and in each case a part of the face with the spectacle frame in the worn position, in each case through the left spectacle lens of the spectacle frame, by means of an optimization method and/or for the local refractive power of the right spectacle lens to be calculated from the derivative of a gradient field which is ascertained from the deflection of the imaging beam path for the image of the at least one structure point of the i) anterior eye portion of the right eye or ii) anterior eye portion of the right eye and in each case a part of the face or iii) anterior eye portion of the right eye and in each case a part of the face with the spectacle lens in the worn position, in each case through the right spectacle lens of the spectacle frame, by means of an optimization method.

The curvature of the spectacle lens which corresponds to the focal power of the lens can be ascertained by differentiating the gradient field in defined directions. Moreover, it is possible to determine the principal axes of the cylindrical power. It is possible to ascertain the position, shape, relative position and refractive index of the material of the spectacle lenses on the basis of an optimization method. An advantage of this calculation method by way of a local gradient field is that this economizes computation time.

By means of the so-called inverse approach, as described in, e.g., the publication by K. N. Kutulakos and E. Steger, "A Theory of Refractive and specular 3D Shape by Light-Path Triangulation," International Journals of Computer Vision, 2008, volume 76, issue 1, pages 13-29, which is herewith referenced in full and the disclosure of which is incorporated in the description of this disclosure, it is then possible, for example, to determine both the position and the shape and relative position as well as the refractive index of the material of the left and right spectacle lens in the spectacle frame of the pair of spectacles, and hence also the dioptric or focal power thereof for a spectacle wearer.

A mathematical problem is referred to as inverse problem if, proceeding from an observed result of the process, the intention is to deduce the original underlying cause thereof. Inverse problems are often ill posed, i.e., the process is not invertible and hence it is not possible to exactly calculate the cause. A typical inverse problem in image processing is, e.g., the calculation of the original image from a blurred image without knowledge of the mapping operator. An inverse approach is a reversal of the so-called forward calculation. On the basis of an inverse approach, the course of the light beams through an optical system consisting of a known optical interfaces and known refractive indices between the interfaces can be calculated in an optical beam calculation, which is also referred to as ray tracing.

Provided that the interfaces, the normals thereof and the refractive indices are known, it is possible to uniquely calculate each light ray through the system. In the case of the inverse approach, an optical interface or refractive index which fits to a given number of light rays is sought after in this case. To determine an error dimension, the forward calculation is carried out on the basis of the surface determined by means of the "inverse approach" and a comparison is then set up of the beam points upstream and/or downstream of the respective interface. By varying the surface to be determined, the error dimension is then minimized in a targeted fashion by means of an optimization method. As an alternative to pure optimization methods which can ascertain the minimum of an error function by parameter variations, it is possible to use so-called light path triangulation methods here, which are also used in combination with an optimization method. Such methods are known, for example, from the aforementioned publication K. N. Kutulakos and E. Steger, "A Theory of Refractive and specular 3D Shape by Light-Path Triangulation, University of Toronto," Proc. 10th IEEE Int. Conf. on Computer Vision, Beijing, China, pages 1448-1455, 2005.

An advantage of the use of an inverse approach is that this allows a greater accuracy to be achieved. A further advantage of using an inverse approach is that this allows the measurement of progressive addition lenses, for example. Moreover, the refraction values of the spectacle wearer can be deduced from the reconstruction of the surface topographies of the front surface and the back surface of the spectacle lens and of the refractive index from the local refractive power and/or refractive power distribution.

As an alternative, a lens can also be modeled as two surfaces and a refractive index as an approximation of the real lens for the purposes of determining the local refractive power and/or refractive power distribution.

An advantageous development of the method therefore provides for a lens to be modeled for determining the local refractive power and/or refractive power distribution of the left spectacle lens, the lens having two surfaces and a lens material refractive index, wherein radii of curvature of at least one of the surfaces and the lens material refractive index of the lens are calculated in an optimization method, and/or for a lens to be modeled for determining the local refractive power and/or refractive power distribution of the right spectacle lens, the lens having two surfaces and a lens material refractive index, wherein radii of curvature of at least one of the surfaces and the refractive index of the lens are calculated in an optimization method.

Typically, for a lens, one of the surfaces is toric and the other is spherical. This modeling of the lenses has the advantage of increased accuracy since the parameters of the lenses can be optimized directly.

By means of an iterative optimization method it is possible to ascertain the best fitting combination of the parameters describing the surfaces and of the refractive indices of the lenses and, from this, it is possible to determine the local refractive power of the lenses in the local surroundings of the visual point in the spectacle lens. In this case, the optimization method can likewise be embodied as an inverse approach.

To determine the refractive power distribution for the whole spectacle lens, the aforementioned calculation is carried out for a multiplicity of first images from different recording positions. The refractive index distribution of a left and/or a right spectacle lens in a spectacle frame is thus determined by measuring a local refractive power of the left and/or of the right spectacle lens according to one of the above-described methods at a multiplicity of different points of the left and/or right spectacle lens.

To measure single vision lenses, it is sufficient to carry out the above-described method steps for a visual point of the pair of spectacles that is as central as possible. From this, it is possible to ascertain variables such as the spherical and cylindrical power in terms of value and direction, and optionally binocular prism values.

To measure multifocal or progressive addition lenses, the method must be repeated in other visual zones of the spectacle lens. In the simplest case, a recording for distance vision and a recording for near vision for the reading range would be sufficient. However, it is likewise conceivable to measure any number of visual points. The only necessary boundary condition is that the spectacle wearer always directs their gaze at the image capture device since this is the only way that the location of the pupil can be calculated exactly. It is not necessary for the spectacle wearer to see the image capture device in focus through the spectacles worn by them. Consequently, it is likewise possible to measure the entire spectacle frame by panning the camera in the entire visual field. Thus it is possible to make statements about a progressive addition design. Values for progressive addition design to be ascertained are, e.g., a "hard" or "soft" design and a progression length or width.

A computer program product according to the disclosure contains a computer program with program code for carrying out the method steps specified above when the computer program is loaded on a computer unit and/or executed on a computer unit.

An apparatus according to the disclosure for measuring the refractive power distribution of a left and/or right spectacle lens in a spectacle frame contains at least one image capture device and a computer unit, loaded in which is a computer program with program code for carrying out the method steps specified above. Alternatively, a program code is conceivable, which can send or receive data to and from at least one further computing unit. Consequently, it is possible to perform the above-described calculations in full or in part on further computer units.

In particular, such an apparatus can be embodied as a smartphone or as a tablet computer or else as a digital camera.

In a further aspect, the above-described method and/or the above-described apparatus and/or the above-described computer program can be used together with at least one further method and/or at least one further apparatus and/or a further computer program. This at least one further method can be for example a method for determining a refractive error of an eye of a user, typically a method as per EP3730037, with this method comprising the following steps:
 a) displaying a sign on a screen, wherein a parameter of the sign displayed on the screen is altered;
 b) capturing an eye movement metric of the eye of the user on the basis of the sign displayed on the screen; and c) determining the time at which a recognition threshold of the user for the sign displayed on the screen emerges from the eye movement metric of the eye of the user; and
d) determining a value for the refractive error of the eye of the user from the parameter defined for the time.

As an alternative or in addition to the above-described method, the at least one further method can also be for example a method for determining at least one optical parameter of a spectacle lens, typically a method as per EP3730998, with this method comprising the following steps:
a) recording an image using a spectacle lens; and
b) ascertaining at least one optical parameter of the spectacle lens by means of image processing of the image, wherein the image comprises an eye region including the eyes and/or a face region of the user of the spectacle lens which adjoins the eyes.

As an alternative or in addition to the above-described methods, the at least one further method can also be for example a method for determining a refractive error of an eye of a user, typically a method as per EP3730036, with the method comprising the following steps:
a) displaying a sign on a screen, wherein a parameter of the sign displayed on the screen is altered;
b) capturing a reaction of the user on the basis of the sign displayed on the screen;
c) determining a time at which a recognizability for the user of the sign displayed on the screen arises from the reaction of the user; and
d) determining a value for the refractive error of the eye of the user from the parameter defined for the time, wherein the sign displayed on the screen is a periodic pattern, wherein the parameter of the pattern displayed on the screen comprises at least one spatial frequency and the value for the refractive error is determined from the spatial frequency of the pattern defined at the time.

As an alternative or in addition to the above-described methods, the at least one further method can also be for example a method for measuring the refractive power distribution of a left and/or a right spectacle lens in a spectacle frame, typically a method as per EP3730919, in which, in a first step, at least one first image representation of a scene is captured by means of at least one image capture device from at least one first recording position, wherein this at least one first image representation has at least two structure points and contains a left and/or a right spectacle lens in a spectacle frame with a portion of the spectacle frame defining the coordinate system of the spectacle frame, wherein the at least one imaging beam path for each of these at least two structure points in each case passes the first and/or the second spectacle lens of the spectacle frame at least once and does not pass the latter at least once. Each imaging beam path comprises the position of the structure point and the chief ray that is incident in the at least one image capture device. In a further step, which can be before or after the first step in time, at least one further image representation of the scene is captured by means of at least one image capture device from the first recording position or from at least one further recording position that differs from the first recording position without the first and/or the second spectacle lens of the spectacle frame or without the spectacle frame containing the first and/or the second spectacle lens but with the same at least two structure points of the first image representation of the scene. The at least one image capture device in the further step can be the same as or different to the at least one image capture device from the first step. Typically, the at least one image capture device in the further step is the same as the at least one image capture device from the first step. Thereupon, in a calculation step, the coordinates of these at least two structure points are determined by means of image evaluation in a coordinate system, referenced to the coordinate system of the spectacle frame, of the image representation of this scene from the respective at least one beam path of these at least two structure points which has not passed the left and/or right spectacle lens in each case and the at least one further image representation of the scene. Subsequently, the refractive index distribution is determined in a step of determining a refractive index distribution for at least one portion of the left spectacle lens in the coordinate system of the spectacle frame and/or in a step of determining a refractive index distribution for at least one portion of the right spectacle lens in the coordinate system of the spectacle frame, in each case from the imaging beam paths which have passed the respective spectacle lens.

As an alternative or in addition to the above-described methods, the at least one further method can also be for example a method for measuring the refractive power distribution of a left and/or a right spectacle lens in a spectacle frame, typically a method as per EP3730919, in which, in a first step, at least one first image representation of a scene is captured by means of at least one image capture device from at least one first recording position, wherein this at least one first image representation has at least two structure points and contains a left and/or a right spectacle lens in a spectacle frame with a portion of the spectacle frame defining the coordinate system of the spectacle frame, wherein the at least one imaging beam path for each of these at least two structure points in each case passes the first and/or the second spectacle lens of the spectacle frame at least once and does not pass the latter at least once. Each imaging beam path comprises the position of the structure point and the chief ray that is incident in the at least one image capture device. In a further step, which can be before or after the first step in time or which can be implemented at the same time as the first step, at least one further image representation of the scene with the left and/or the right spectacle lens in the spectacle frame and with a portion of the spectacle frame that defines a coordinate system of the spectacle frame is captured by means of at least one image capture device from at least one further recording position that differs from the first recording position with at least one imaging beam path for the same at least two structure points captured in the first image representation, wherein this at least one imaging beam path in each case passes through the first and/or the second spectacle lens in the spectacle frame at least once and does not pass through the latter at least once. Thereupon, in a further step, the coordinates of the at least two structure points are calculated by means of image evaluation in a coordinate system, referenced to the coordinate system of the spectacle frame, of the scene from the respective at least one beam path of these at least two structure points which has not passed the left and/or right spectacle lens in each case and the at least one further image representation of the scene. Subsequently, the refractive index distribution is calculated for at least one portion of the left spectacle lens in the coordinate system of the spectacle frame and/or the refractive index distribution is determined for at least one portion of the right spectacle lens in the coordinate system of the spectacle frame, in each case from the imaging beam paths which have passed the respective spectacle lens.

In the two aforementioned methods for measuring the refractive power distribution of a left and/or a right spectacle lens, typically in a spectacle frame, a multiplicity of structure points are typically captured in the respective first image representation of a scene from in each case at least one first image recording position and the respective subsequent steps are carried out on the basis of this respective multiplicity of structure points. A multiplicity of structure point is understood to mean typically at least 10, further typically at least 100, particularly typically at least 1,000 and very particular typically at least 10,000 structure points. A multiplicity of structure points is in particular ≥100 structure points and ≤1,000 structure points.

In a superordinate application, the various above-described methods, i.e., the method according to the disclosure and the at least one further method, can be combined in order for example to obtain a higher accuracy or a plausibility check for the results obtained in the individual methods from the comparison of the respectively obtained results. The various above-described methods can be implemented successively or simultaneously in the superordinate application If the various methods are implemented in succession, the sequence thereof can be independent of one another and/or this can be any sequence. If the various methods are implemented in succession, it may be preferable to carry out at least one of the above-described methods for determining the refractive power distribution in a final step. By way of example, a superordinate application can be a computer program comprising the various methods.

BRIEF DESCRIPTION OF THE DRAWINGS

The disclosure will now be described with reference to the drawings wherein.

DESCRIPTION OF EXEMPLARY EMBODIMENTS

Figure 1:
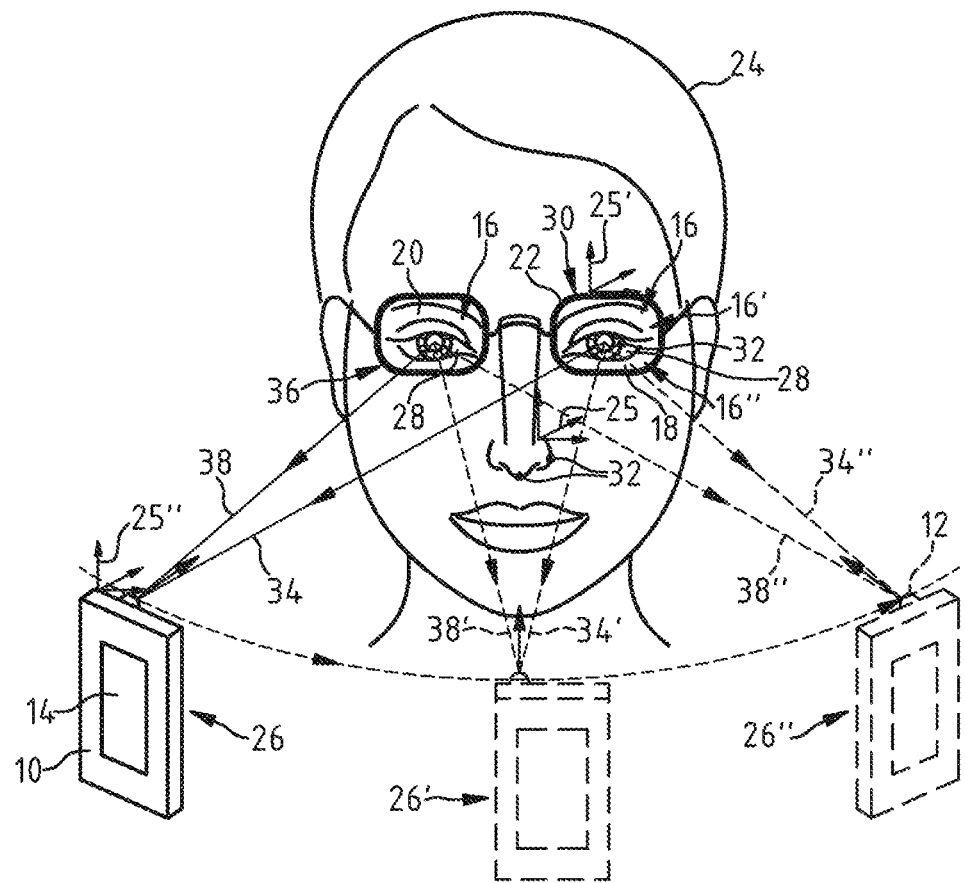
FIG. 1 shows an apparatus with an image capture device for measuring the local refractive power of a left and right spectacle lens in a spectacle frame with the head of the spectacle wearer who wears spectacle frame.

The apparatus 10 shown in FIG. 1 is embodied as a smartphone which contains an image capture device 12 with an objective lens system, which has an entrance stop, and an image sensor. In the smartphone there is a computer unit 14 designed to carry out image processing routines.

It should be observed however that within the scope of the disclosure provision can also be made for the apparatus 10 to contain a displaceable image capture device and for image data to be transferred via a cable or radio connection to a fixedly arranged computer unit for carrying out image processing routines.

By means of the apparatus 10 it is possible at a multiplicity of different points 16, 16', 16" to measure the local refractive power of a left spectacle lens 18 and in a right spectacle lens 20 in a spectacle frame 22 worn on the head 24 of the spectacle wearer. Hence, the apparatus 10 facilitates the measurement of the refractive power distribution of the left and of the right spectacle lens 18, 20. It should be observed that, as an alternative to a smartphone, the apparatus 10 can also be embodied in particular as a tablet computer with an image capture device or as a digital camera with a computer unit.

To measure the local refractive power of the left spectacle lens 18 in the spectacle frame 22, the head 24 of the spectacle wearer is captured in a first step from different recording positions 26, 26', 26" by means of the image capture device 12 of the apparatus 10 in order thereby to obtain different first image representations 39, 39', 39" with an image of the anterior eye portion 28 of the left eye 30 with an extended structure 33 therein containing a plurality of structure points 32, wherein the left eye 30 of the spectacle wearer in each case has a line of sight 34, 34', 34" that points to the recording position 26, 26', 26" of the image capture device, the line of sight in the process passing through an entrance stop in the image capture device 12 where possible. Accordingly, to measure the local refractive power of the right spectacle lens 20 in the spectacle frame 22, the head 24 of the spectacle wearer is captured from different recording positions 26, 26', 26" by means of the image capture device 12 of the apparatus 10 in order thereby to also obtain different first image representations 39, 39', 39" with an image of the anterior eye portion 28 of the right eye 36 with a structure 33 therein containing a plurality of structure points 32, wherein the right eye 36 of the spectacle wearer in each case has a line of sight 38, 38', 38" that points to the recording position 26, 26', 26" of the image capture device 12, the line of sight passing through the entrance stop in the image capture device 12 where possible.

Figure 2:
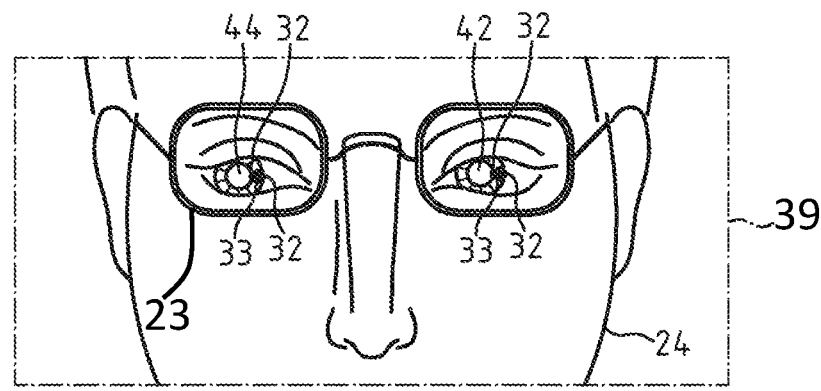
FIG. 2 shows a first image representation of a portion of the head of the spectacle wearer with the spectacle frame, captured by means of the image capture device from a first recording position.

FIG. 2 shows the first image representation 39 of a portion of the head 24 of the spectacle wearer with the spectacle frame 22 and with an image of an anterior eye portion 28 of the left eye 30 with the structure points 32 of the structure 33, the iris, therein and with an image of an anterior eye portion 28 of the right eye 36 with a structure 33, the pupil, with a plurality of structure points 32, the first image representation having been captured from the recording position 26 by means of the image capture device 12 in the apparatus 10. The first image representation 39' of the portion of the head 24 of the spectacle wearer with the spectacle frame 22 and with an image of the anterior eye portion 28 of the left eye 30 with the structure 33 with structure points 32 therein and with an image of an anterior eye portion 28 of the right eye 36 with the structure points 32 and the structure 33 can be seen in FIG. 3, the first image representation having been captured from the recording position 26' by means of the image capture device 12 in the apparatus 10. FIG. 4 shows the first image representation 39' of the portion of the head 24 of the spectacle wearer with the spectacle frame 22 and with an image of the anterior eye portion 28 of the left eye 30 with the structure 33 with structure points 32 therein and with an image of an anterior eye portion 28 of the right eye 36 with the structure 33 and the structure points 32, the first image representation having been captured from the recording position 26" by means of the image capture device 12 in the apparatus 10.

Figure 3:
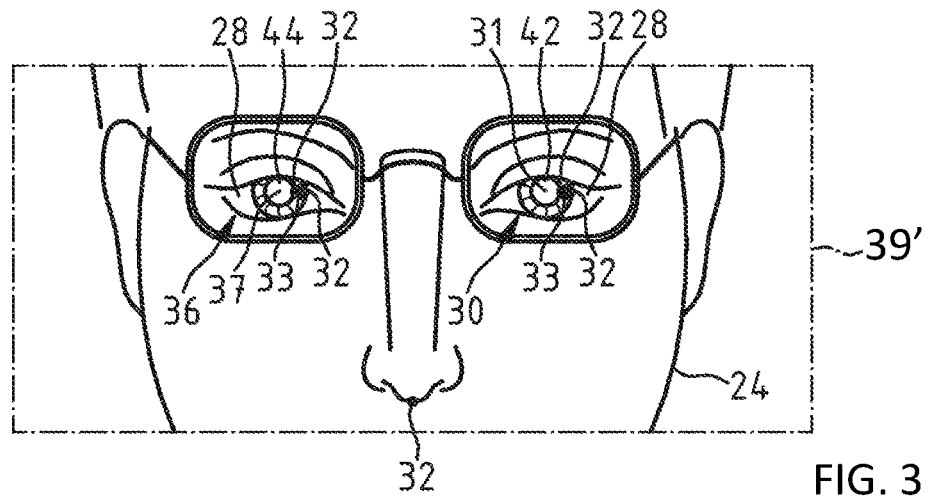
FIG. 3 shows a further first image representation of a portion of the head of the spectacle wearer with the spectacle frame, captured by means of the image capture device from a second recording position that differs from the first recording position.
Figure 4:
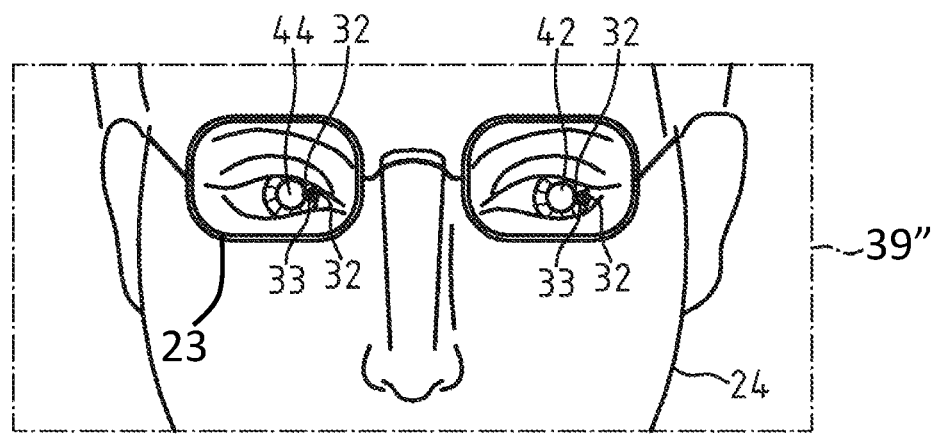
FIG. 4 shows a further first image representation of a portion of the head of the spectacle wearer with the spectacle frame, captured by means of the image capture device from a third recording position.

As can be seen in FIG. 2, FIG. 3, and FIG. 4, the first image representations 39, 39', 39" shown therein do not only each contain an image of the anterior eye portion 28 of the left eye 30 with at least one structure point 32 therein and an image of the right eye 36 with a structure point 32 therein in the case of a line of sight which passes through the entrance stop of the image capture device 12 in the different recording positions 26, 26' and 26" shown in FIG. 1 but also contain images of in each case the same portion 23 of the spectacle frame 22 and an image of the pupil 42 of the left eye 30 and an image of the pupil 44 of the right eye 36.

Figure 5:
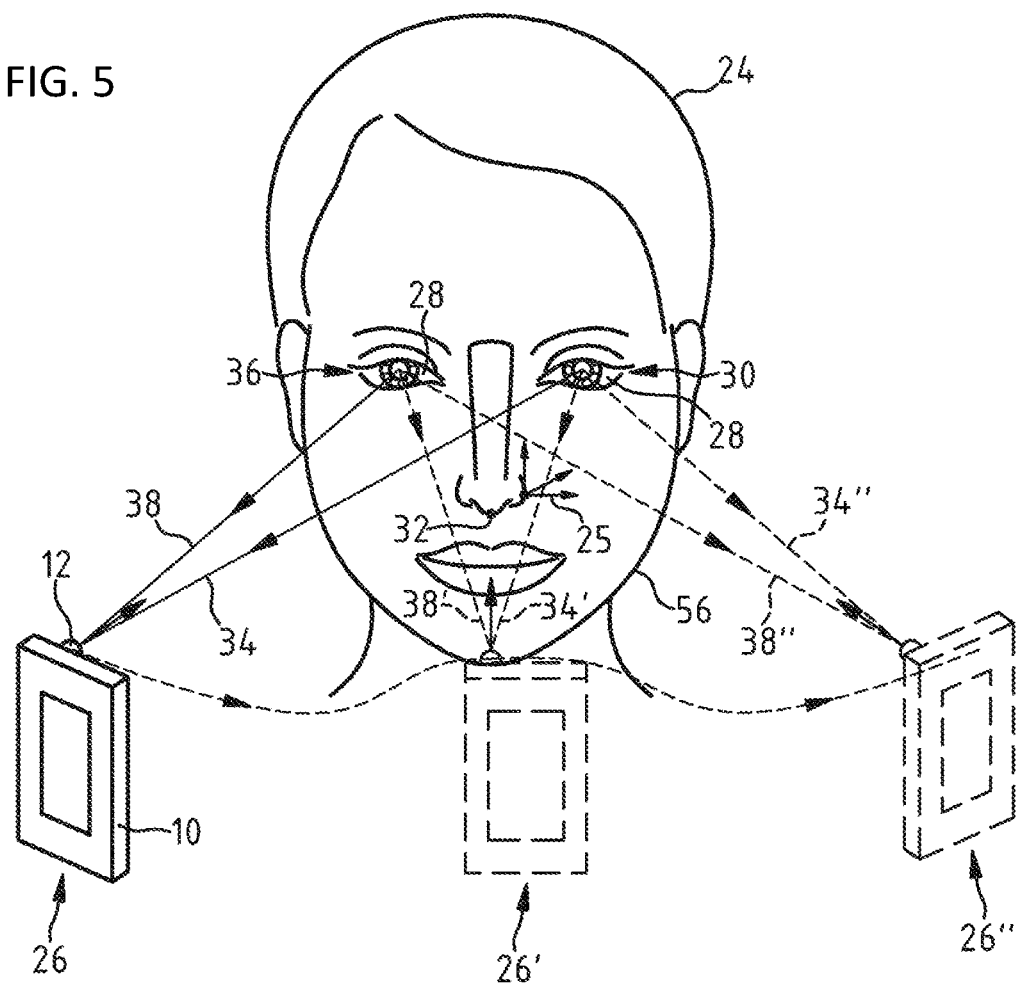
FIG. 5 shows the apparatus with the image capture device for measuring the local refractive power of the left and right spectacle lens in a spectacle frame with the head of the spectacle wearer without the spectacle frame, wherein the line of sight of the left and right eye is directed at the image capture device.

In a second step, which can be before or after the first step in time, the head 24 of the spectacle wearer, as can be seen in FIG. 5, is captured without the spectacle frame 22 by means of the image capture device 12 of the apparatus 10 from further different recording positions 26, 26', 26," which may differ from the recording positions for recording the head of the spectacle wearer with the spectacle frame, in order thereby to obtain different second image representations 41, 41', 41" with an image of the anterior eye portion 28 of the left eye 30 with the structure 33 and the structure points 32 therein. Here, the line of sight 34 of the left eye 30 of the spectacle wearer is once again directed at an entrance stop of the image capture device 12 of the apparatus 10.

Accordingly, to measure the local refractive power of the right spectacle lens 20 in the spectacle frame 22, the head 24 of the spectacle wearer is captured from different recording positions 26, 26', 26" by means of the image capture device 12 of the apparatus 10 in order thereby to also obtain different second image representations 41, 41', 41" with an image of the anterior eye portion 28 of the right eye 36 with the structure 33 and the structure points 32. Here, the line of sight 38 of the right eye 36 of the spectacle wearer is once again directed at an entrance stop of the image capture device 12 of the apparatus 10.

Figure 6:
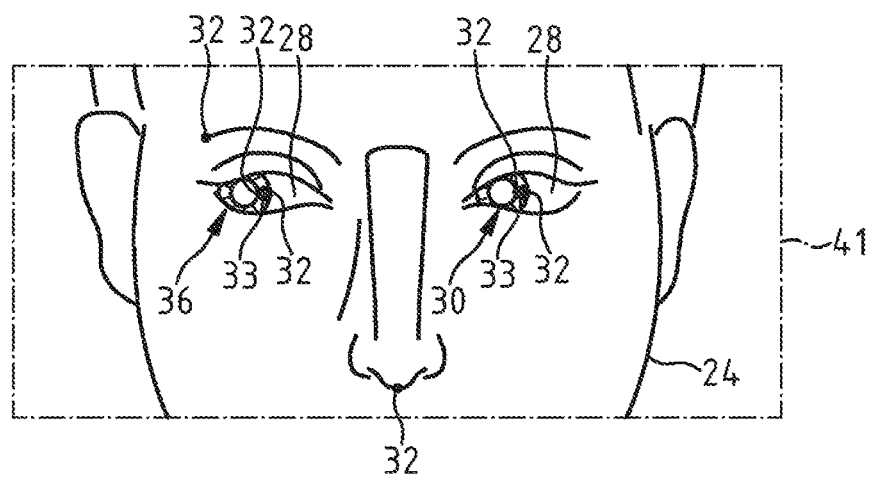
FIG. 6 shows a second image representation of a portion of the head of the spectacle wearer without the spectacle frame, captured by means of the image capture device from a further recording position.

FIG. 6 shows the second image representation 41 of a portion of the head 24 of the spectacle wearer without spectacle frame 22 and with an image of an anterior eye portion 28 of the left eye 30 with the structure 33 and the structure points 32 and with an image of an anterior eye portion 28 of the right eye 36 with the structure 33 and the structure points 32, the second image representation having been captured from the recording position 26 by means of the image capture device 12 in the apparatus 10.

Figure 7:
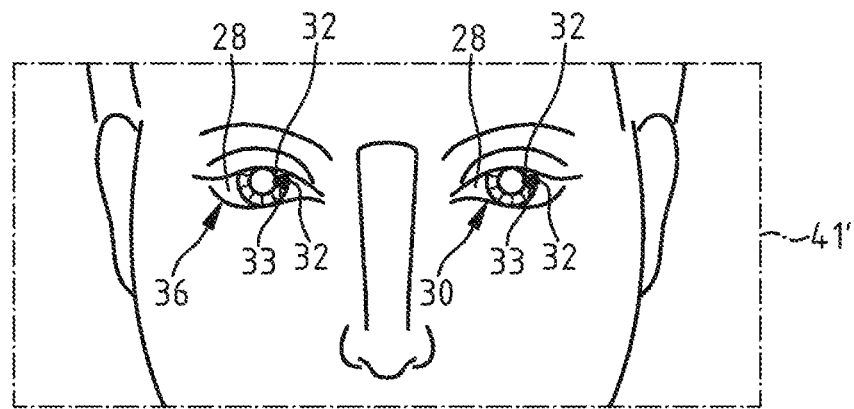
FIG. 7 shows a further second image representation of a portion of the head of the spectacle wearer without the spectacle frame, captured by means of the image capture device from a further recording position.

The second image representation 41' of the portion of the head 24 of the spectacle wearer without spectacle frame 22 and with an image of the anterior eye portion 28 of the left eye 30 with the structure 33 and the structure points 32 therein and with an image of an anterior eye portion 28 of the right eye 36 with the structure 33 and the structure points 32 are illustrated in FIG. 7, the second image representation having been captured from the recording position 26' by means of the image capture device 12 in the apparatus 10.

Figure 8:
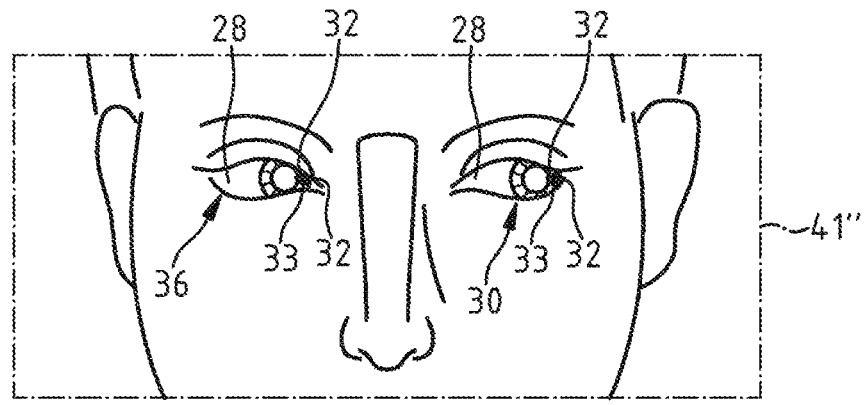
FIG. 8 shows a further second image representation of a portion of the head of the spectacle wearer without the spectacle frame, captured by means of the image capture device from a further recording position.

FIG. 8 shows the second image representation 41" of the portion of the head 24 of the spectacle wearer without spectacle frame 22 and with an image of the anterior eye portion 28 of the left eye 30 with the structure 33 and the structure points 32 and with an image of an anterior eye portion 28 of the right eye 36 with the structure 33 and the structure points 32, the second image representation having been captured from the recording position 26" by means of the image capture device 12 in the apparatus 10.

Figure 9:
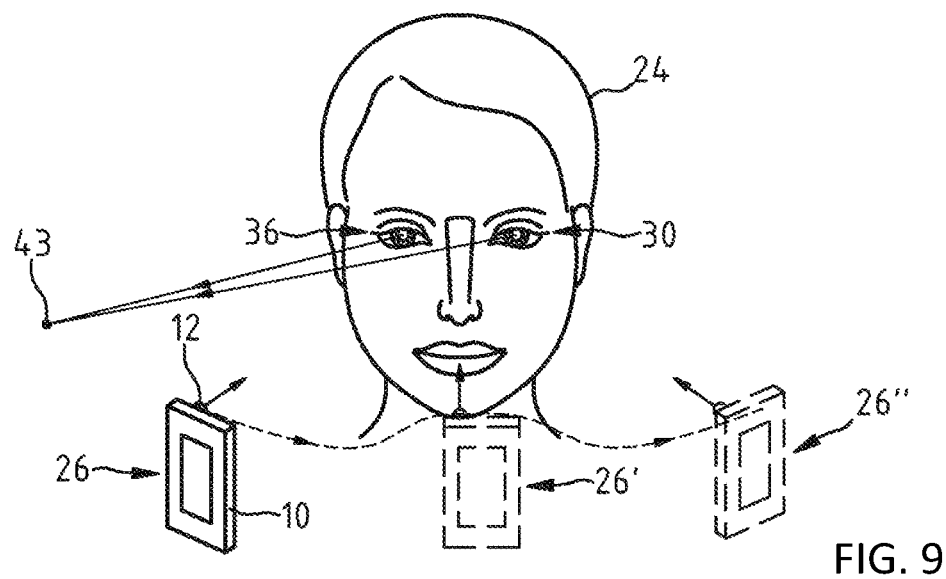
FIG. 9 shows the apparatus with the image capture device for measuring the local refractive power of the left and right spectacle lens in a spectacle frame with the head of the spectacle wearer without the spectacle frame and invariant lines of sight of the left and right eye.

As an alternative to different second image representations 41, 41', 41" of the head 24 of the spectacle wearer without a spectacle frame 22 with an image of the anterior eye portion 28 of the left eye 30 and/or the right eye 36 with at least one structure point 32 being captured by means of the image capture device 12 while the spectacle wearer directs their gaze at an entrance stop of the image capture device 12, it is also possible, as shown in FIG. 9, to capture second image representations 41, 41', 41" of the head 24 of the spectacle wearer without the spectacle frame 22 with an image of the anterior eye portion 28 of the left eye 30 and/or of the right eye 36 with at least one structure point 32 while the spectacle wearer, as shown in FIG. 9, gazes at a stationary point 43 in space or, alternatively, at a point at infinity.

Figure 10:
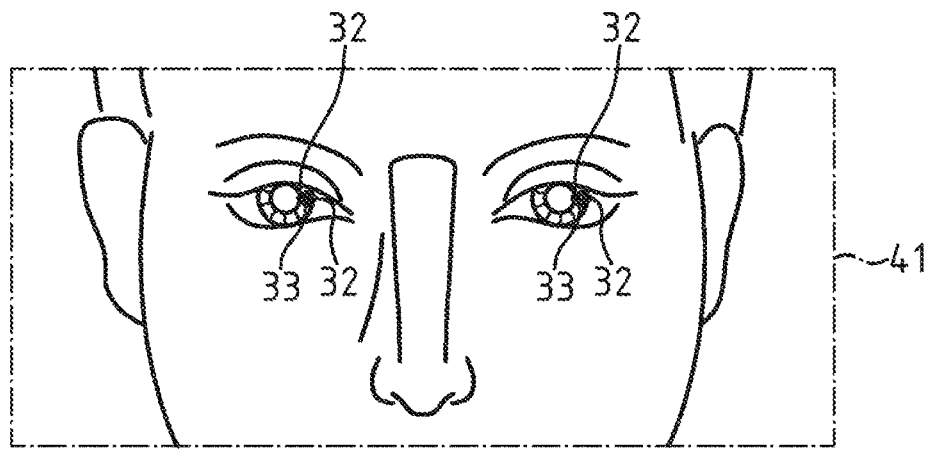
FIG. 10 shows a second image representation of a portion of the head of the spectacle wearer without the spectacle frame, captured by means of the image capture device from a further recording position, with invariant lines of sight of the left and right eye.

FIG. 10 shows a second image representation 41 of the portion of the head 24 of the spectacle wearer without spectacle frame 22 captured by means of the image capture device 12 in the apparatus 10 from the recording position 26 identified in FIG. 9. A second image representation 41' of the portion of the head 24 of the spectacle wearer without spectacle frame 22 captured by means of the image capture device 12 in the apparatus 10 from the recording position 26' identified in FIG. 9 can be seen in FIG. 11. FIG. 12 shows a second image representation 41" of the portion of the head 24 of the spectacle wearer without spectacle frame 22 captured by means of the image capture device 12 in the apparatus 10 from the recording position 26" identified in FIG. 9.

Figure 11:
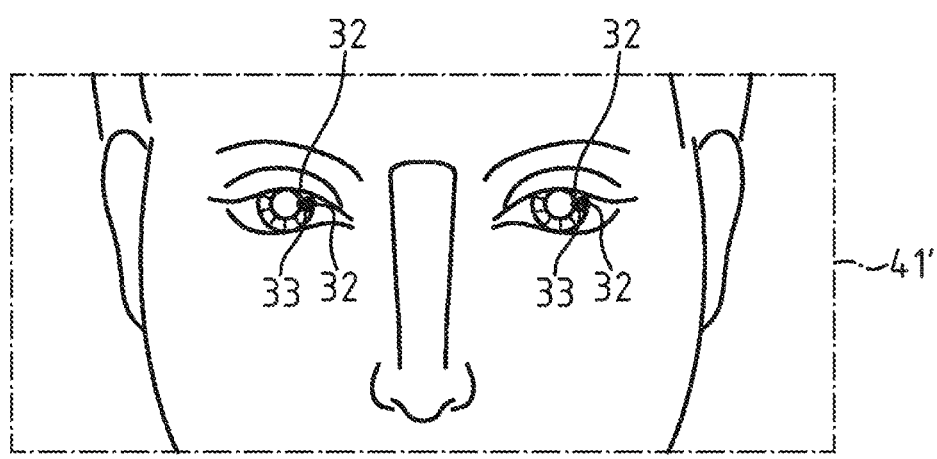
FIG. 11 shows a further second image representation of a portion of the head of the spectacle wearer without the spectacle frame, captured by means of the image capture device from a further recording position, with invariant lines of sight of the left and right eye.
Figure 12:
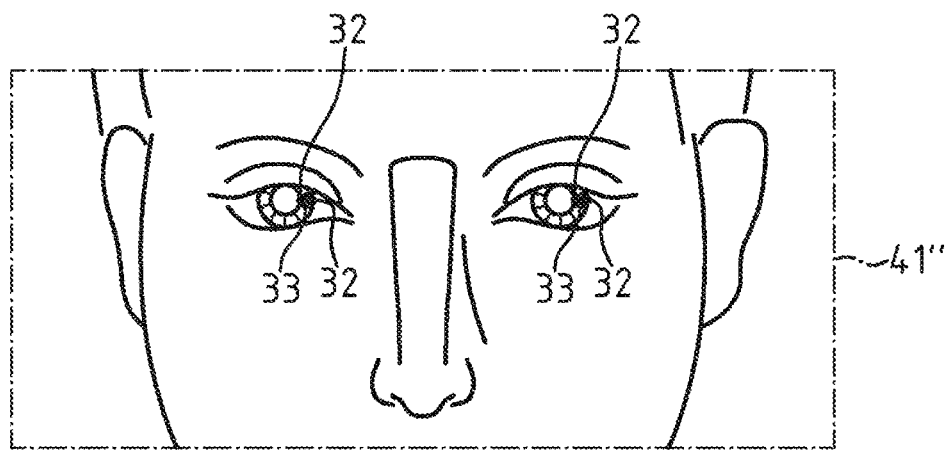
FIG. 12 shows a further second image representation of a portion of the head of the spectacle wearer without the spectacle frame, captured by means of the image capture device from a further recording position, with invariant lines of sight of the left and right eye.
Figure 13:
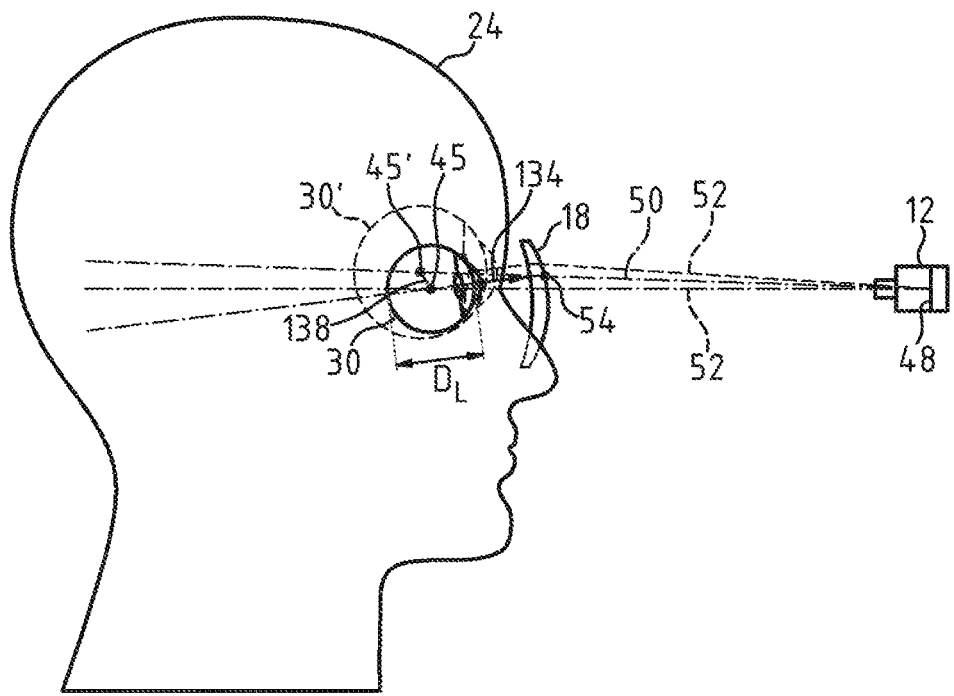
FIG. 13 shows the head of the spectacle wearer with a left eye and its eye rotation point, and a left spectacle lens and the image capture device.

The second image representations 41, 41', 41" shown in FIG. 6, FIG. 7, and FIG. 8 and also in FIG. 10, FIG. 11, and FIG. 12 in each case contain not only an image of the anterior eye portion 28 of the left eye 30 with the structure 33 and the structure points 32 and an image of the anterior eye portion 28 of the right eye 36 with the structure 33 and the structure points 32 for the different recording positions 26, 26', 26" of the image capture device 12 shown in FIG. 5 and FIG. 9, respectively, but also contain, in addition to an image of the pupil 42 of the left eye 30 and an image of the pupil 44 of the right eye 36, a structure point 32 of the head 24 of the spectacle wearer in the form of a point on the tip of the nose, the relative position of which in a coordinate system 25 that is stationary with respect to the head 24 of the spectacle wearer is independent as a matter of principle from the line of sight 34, 34', 34" of the left eye 30 and of the line of sight 38, 38', 38" of the right eye 36—unlike the relative position of the structure points 32 in the anterior eye portion 28 of the left and right eye 30, 36, which generally depend on the respective line of sight. However, a point whose relative position in a coordinate system 25 that is stationary with respect to the head to 24 of the spectacle wearer is generally independent on the line of sight 34, 34', 34," 38, 38', 38" of the left and/or right eye 30, 36 can also be, for example, a point on a nasal wing of the nose or a point of an eyebrow FIG. 13 shows the head 24 of the spectacle wearer with the left eye 30 and its eye rotation point 45, and the left spectacle lens 18 and the image capture device 12. The head 24 of the spectacle wearer with the right eye 36 and its eye rotation point 47, and the right spectacle lens 20 and the image capture device 12 can be seen in FIG. 14. By means of the image capture device 12, the left and right eye 30, 36 are captured through the left and right spectacle lens 18, 20 as the image of an apparent left or right eye 30', 36', the apparent left or right eye, depending on the dioptric properties of the left or right spectacle lens 18, 20, being larger or smaller than the left or right eye 30, 36 and being offset therefrom.

Spectacle frame information data which comprise information from the group of position, relative position, shape and coordinates of the spectacle frame 22 in a coordinate system 25' that is stationary with respect to the spectacle frame are calculated by means of image evaluation in the computer unit 14 of the apparatus 10 from first image representations 39, 39', 39," as shown in FIG. 2 to FIG. 4 and which contain identical portions of the spectacle frame 22.

The coordinates of the structure points 32 of the anterior eye portion 28 of the left eye 30 and the coordinates of the structure points 32 of the anterior eye portion 28 of the right eye 36 are calculated by means of image evaluation in the computer unit 14 of the apparatus 10 from the second image representations 41, 41', 41," as are shown in FIG. 6, FIG. 7, and FIG. 8 and also FIG. 10, FIG. 11, and FIG. 12 Then, the size of structures, for example the iris, in the anterior eye portion 28 of the left or right eye 30, 36 can be determined on the basis of the distances between the structure points 32. It is possible to deduce the local refractive power from the ratios of the sizes of the structures observed through the spectacle lens in the first image representations to the real sizes of the structures calculated from the second image representations.

Moreover, the coordinates of the eye rotation point 45 of the left eye 30 and of the eye rotation point of 47 of the right eye 36 are calculated in the computer unit 14 from an assumed eye diameter $D_L$ for the left eye 30 and from an assumed eye diameter $D_R$ for the right eye 36 and from the coordinates of structure points 32 of the head 24, wherein the coordinates thereof are determined from at least two image representations of a group of at least two first image representations 39, 39', 39," as shown in FIG. 2 to FIG. 4, and at least two second image representations 41, 41', 41," as shown in FIG. 6 to FIG. 8 and FIG. 10 to FIG. 12.

The eye rotation point 45 of the left eye 30 and the eye rotation point 47 of the right eye 36 are determined to this end from known information relating to the relative position of the left and right eye 30, 36 in the head 24 of the spectacle wearer on the basis of coordinates relating to structure points 32 of the head 24, for example the tip of the nose, and an assumed, e.g., standardized, value for the eye diameter $D_L$ of the left eye 30 and an assumed value for the eye diameter $D_R$ of the right eye 36. As a matter of principle, the eye diameter $D_L$, $D_R$ of the left and right eye 30, 36 of a person depends on their sex and their age. It was found that the assumption of an eye diameter $D_{L,R}$ with 22 mm≤$D_{L,R}$≤23 mm is a good estimate for the actual size of an eye diameter.

The coordinates of structure points 32 of the anterior eye portion 28 of the left eye 30 and of the right eye 36 are calculated in the computer unit 14 of the apparatus 10 from the captured second image representations 41, 41', 41" of the head 24 of the spectacle wearer without the spectacle frame 22, as shown in FIG. 6 to FIG. 8 and FIG. 10 to FIG. 12, by virtue of the image of one and the same structure point 32 being detected in different image representations 41, 41', 41" by means of a feature matching method and then being triangulated on the basis of known intrinsic and extrinsic parameters of the image capture device 12. These intrinsic and extrinsic parameters of the image capture device 12 are stored in a data memory of the computer unit 14. By way of example, they can be determined by means of a camera calibration method or else by means of a SLAM method. It should be observed that, in particular, so-called depth estimation methods and 3-D reconstruction methods can be used for this triangulation.

Then, the visual point 54 on the spectacle lens 18 is determined in the computer unit 14 for a first image representation 39, 39', 39" shown in FIG. 2 to FIG. 4.

To this end, the pupil center 31 of the pupil 42 of the left eye 30 is initially determined using image evaluation for the corresponding first image representation 39, 39', 39" in this image representation. By way of example, this can be implemented in an algorithm on the basis of a segmentation of the anterior eye portion 28 of the left eye 30, within the scope of which dark ellipses are detected within this anterior eye portion 28, the geometric center of which is assumed to be the sought-after pupil center 31. It should be observed that this determination of the pupil center need not necessarily be implemented in a computer unit but, in principle, can also be implemented manually by a person who applies the method for measuring the local refractive power of the refractive power distribution of a left and/or a right spectacle lens.

On the basis of knowledge of the intrinsic and extrinsic parameters of the image capture device 12 when capturing an image representation 39, 39', 39" it is thus possible to determine the chief ray 50 of the imaging beam path 52 associated with the assumed pupil center 31, shown in FIG. 3, of the pupil 42 of the left eye 30 in the image plane 48 of the image capture device 12, by means of which imaging beam path the pupil center 31 of the pupil 42 of the left eye 30 is imaged through the left spectacle lens 18 into the image plane 48 of the image capture device 12. This chief ray 50 is refracted by the left spectacle lens 18. The visual point 54 at which the chief ray 50 passes through the left spectacle lens 18 on the side facing away from the spectacle wearer can then be calculated as the point of intersection of the chief ray 50 with the left spectacle lens 18, i.e., as the visual point (x,y) of the left eye 30 through the left spectacle lens 18, when the spectacle frame information data, i.e., the coordinates of the spectacle frame 22 on the head 24 of the spectacle wearer, as ascertained in the description above is taken into account. From this, it is possible to determine an assumed line of sight 134 of the left eye 30 of the spectacle wearer, which corresponds to a vector pointing from the eye rotation point 45 of the left eye 30 in the direction of the visual point 54 on the left spectacle lens 18. The point of intersection of this vector with a sphere around the eye rotation center 45 of the left eye 30, the diameter of which corresponds to the eye diameter $D_L$, then yields the pupil center 31 of the pupil 42 of the left eye 30.

Figure 14:
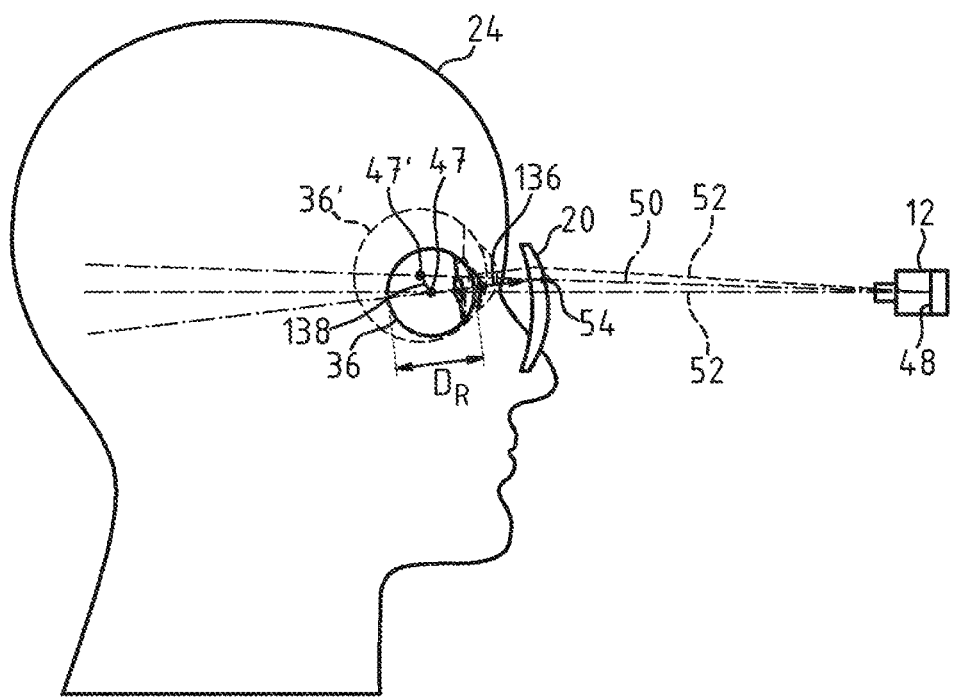
FIG. 14 shows the head of the spectacle wearer with a right eye and its eye rotation point, and a right spectacle lens and the image capture device.

To determine the visual point 54, shown in FIG. 14, of the right spectacle lens 20, the pupil center 37 of the pupil 44 of the right eye 36 is initially determined for the corresponding first image representation 39, 39', 39" in this image representation by means of image evaluation. Once again, this can be implemented by means of the algorithm specified above or by hand. Then, on the basis of knowledge of the intrinsic and extrinsic parameters of the image capture device 12 when capturing an image representation 39, 39', 39" it is also possible here to determine the chief ray 50 of the imaging beam path 52 associated with the assumed pupil center 37, shown in FIG. 3, of the pupil 44 of the right eye 36 in the image plane 48 of the image capture device 12, by means of which imaging beam path the pupil center 37 of the pupil 44 of the right eye 36 is imaged through the right spectacle lens 20 into the image plane 48 of the image capture device 12. This chief ray 50 is refracted by the right spectacle lens 20. The location of the refraction of this chief ray 50 on the right spectacle lens 20 can then once again be calculated the a point of intersection of the chief ray 50 with the right spectacle lens 20, i.e., as the visual point (x,y) through the right spectacle lens 20, when the spectacle frame information data, i.e., the coordinates of the spectacle frame 22 on the head 24 of the spectacle wearer, as ascertained in the description above is taken into account.

From this, it is possible to determine an assumed line of sight 136 of the right eye 36 of the spectacle wearer, which corresponds to a vector starting from the eye rotation point 47 of the right eye 36 and pointing in the direction of the visual point 54 on the right spectacle lens 20. The point of intersection of this vector with a sphere around the eye rotation center 47 of the right eye 36, the diameter of which corresponds to the eye diameter $D_R$, then yields the pupil center 37, shown in FIG. 3, of the pupil 44 of the right eye 36.

From the structure points 32 of the structures of the anterior eye portion 28 of the left eye 30, sizes of the structures therein are determined on the basis of the coordinates of these structure points 32, calculated in advance from the second image representations 41, 41', 41," and on the basis of the distances thereof from one another, for example the diameter of the iris. Moreover, the size of the apparent structures 33 observed through the left spectacle lens 18, 20 is determined as follows on the basis of a first image representation 39, 39', 39": the associated chief ray 50 is calculated for each structure point 32 in these image representations by means of the intrinsic and extrinsic parameters of the image capture device 12 and the point of intersection of the chief ray with the left spectacle lens 18 is determined. From these points of intersection and the distances thereof from one another it is then possible to determine the apparent sizes of the structure 33 in the case of an observation through the left spectacle lens 18. Then, the local refractive power at the visual point 54 of the left spectacle lens 18 can be specified by the ratio of the real to the apparent sizes.

From the structure points 32 of the structures of the anterior eye portion 28 of the right eye 36, sizes of the structures 33 therein are determined on the basis of the coordinates of these structure points 32, calculated in advance from the second image representations 41, 41', 41," and on the basis of the distances thereof from one another, for example the diameter of the iris. Moreover, the size of the apparent structures 33 observed through the right spectacle lens 20 is determined as follows on the basis of the first image representation 39, 39', 39": the associated chief ray 50 is calculated for each structure point 32 in these image representations by means of the intrinsic and extrinsic parameters of the image capture device 12 and the point of intersection of the chief ray with the right spectacle lens 20 is determined. From these points of intersection and the distances from one another it is then possible to determine the apparent sizes of the structure 33 in the case of an observation through the right spectacle lens 20. The refractive power of the left or right spectacle lens 18, 20 at the points passed through by the assumed line of sight 134, 136 arises by evaluating the imaging equations from the ratio of sizes of the structures 33, when these are captured by means of the image capture device 12 without a spectacle lens 18, 20 arranged between the image capture device 12 and the left or right eye 30, 36, to the sizes of the structures which these have in the image representations captured by means of the image capture device 12 through the left or right spectacle lens 18, 20.

Then, from the calculated relative position (x,y) of the visual points 54 on the left or right spectacle lens 18, 20 for the assumed line of sight 134 of the left eye 30 and for the assumed line of sight 136 of the right eye 36 and the coordinates of the eye rotation points 45, 47, calculated as described above, for the right or left eye 30, 36, the prismatic effect of the left or right spectacle lens 18, 20 is determined in the computer unit 14 of the apparatus 10 on the basis of a three-dimensional offset 138 of the eye rotation points 45, 47' of the apparent left or right eye 30, 36' from the eye rotation point 45, 47 of the left or right eye 30, 36, the offset being ascertained on the basis of the imaging equations for the eye rotation point 45', 47' by means of the image capture device through the left or right spectacle lens 18, 20.

What should be observed is that the local prismatic effect can also be ascertained in the step of determining the local dioptric power of the left spectacle lens at the visual point on the basis of an offset of the anterior eye portion in the image of the left eye as a matter of principle.

Figure 15:
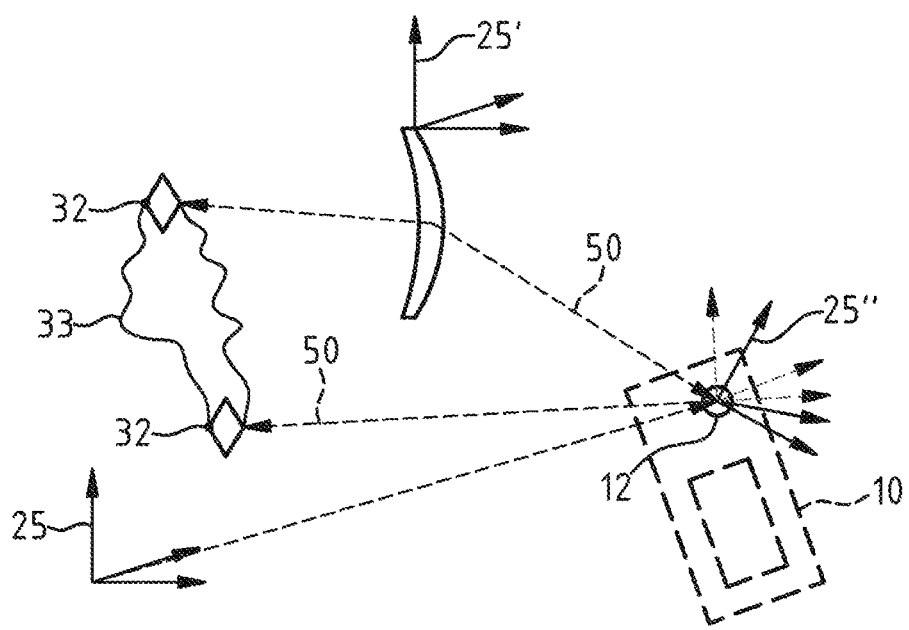
FIG. 15 shows the apparatus with an image capture device for measuring the local refractive power of a left and/or right spectacle lens, with an imaging beam path for structure point which passes through the spectacle lens and with an imaging beam path for structure point which does not pass through the spectacle lens.

FIG. 15 explains the calculation of imaging beam paths for structure points 32 of a structure 33, the images of which are located in image representations captured by means of the image capture device 12.

From a pixel coordinate in homogeneous coordinates $$C = \begin{pmatrix} C_x \\ C_y \\ 1 \end{pmatrix}$$

of a structure point 32, imaged in the image capture device 12, of an eye portion 28 of the left eye 30 or of the right eye 36, the known camera calibration operator $\overline{K}$ is used, as described above, to determine the chief ray 50 of the imaging beam path 52 that images into the image plane of the image capture device 12, for the one structure point 32 in the form of a three-dimensional vector in a coordinate system 25" of the image capture device $$\vec{r}_0 = \overline{K}^{-1} \cdot C$$

From the extrinsic parameters of the image capture device 12 for a recording position 26 known in relation to the spectacle frame 22 and the head 24 of the spectacle wearer, i.e., the spatial relative position and orientation of the image capture device 12 with the coordinate system 25" in a coordinate system 25' of the spectacle frame 22 and in a coordinate system 25, which is stationary with respect to the head 24 of the spectacle wearer, $\vec{r}_0$ is then converted by the linear transformation $$\vec{r}_{Scene} = \overline{R}^T \cdot (\vec{r}_0 - \overline{T})$$

from the coordinate system 25" of the image capture device 12 by a rotation corresponding to the inverse rotation operator $\overline{R}^T$ and a translation corresponding to the inverse translation operator $-\overline{T}$ to the coordinate system 25' of the spectacle frame 22 or the coordinate system 25 which is stationary with respect to the head 24 of the spectacle wearer.

Then, from each imaged structure point 32, a chief ray 50 of the imaging beam path 52, which passes through a spectacle lens 18, 20 of the spectacles with a known position and relative position in the coordinate system 25" of the image capture device 12, is calculated in accordance with the recording position 26 of the image capture device 12. From this and from the previously determined coordinates of the different structure points 32 of the eye portion 28 of the left eye 30 or of the right eye 36, a beam model then emerges, which contains the associated imaging beam path 52 which was deflected at the visual point 54 of the left or right spectacle lens 18, 20 for each structure point 32. From this, it is possible to determine the prismatic effect of the corresponding left or right spectacle lens 18, 20.

By virtue of the local refractive power k(x,y) of the left and right spectacle lens 18, 20 being determined for many different lines of sight of the spectacle wearer, i.e., a multiplicity of different visual points 54 on the left and right spectacle lens 18, 20, the computer unit 14 is then capable of ascertaining the distribution of the refractive power k(x,y) over the spectacle lens 18, 20.

It should be observed that the accuracy of the calculation of the local refractive power k(x,y) of the left and right spectacle lens 18, 20 can be increased, in particular, by virtue of capturing and evaluating a multiplicity of different structure points 32 in the anterior eye portion 28 of the left and right eye 30, 36 of a spectacle wearer in a multiplicity of first and second image representations of the head 24 of the spectacle wearer.

To sum up, the following preferred features of the disclosure should be noted in particular: The disclosure relates to a method for measuring the local refractive power or the refractive power distribution of a left and/or a right spectacle lens 18, 20, typically in a spectacle frame 22, in the worn position on the head 24 of a spectacle wearer. The disclosure also relates to a computer program product having a computer program with program code and to an apparatus for carrying out the method.

The method for measuring the local refractive power of a left and/or a right spectacle lens 18, 20 in a spectacle frame 22 in the worn position on the head 24 of a spectacle wearer includes:

a step of capturing at least two first image representations from different recording positions 26, 26', 26" relative to the head 24, with the at least two first image representations 39, 39', 39" each containing:

an image of an anterior eye portion 28 of a left eye 30 with at least two spaced apart structure points 32 therein, wherein the left eye 30 in each case has a line of sight 34, 34', 34" that points to the recording position 26, 26', 26" and wherein an imaging beam path 52 that images the at least two structure points 32 passes through the left spectacle lens 18, and/or an image of an anterior eye portion 28 of a right eye 36 with at least two spaced apart structure points 32 therein, wherein the right eye 36 in each case has a line of sight 38, 38', 38" that points to the recording position 26, 26', 26" and wherein an imaging beam path 52 that images the at least two structure points 32 passes through the right spectacle lens 20, a step of capturing at least two second image representations 41, 41', 41" from different recording positions 26, 26', 26" relative to the head 24, with the at least two second image representations 41, 41', 41" each containing:

an image of the at least two spaced apart structure points 32 of the anterior eye portion 28 of the left eye 30 without the left spectacle lens 18 of the spectacle frame 22 or without the spectacle frame 22 containing the left spectacle lens 18, or with the left spectacle lens 18, wherein the imaging beam path 52 underlying the image of the at least two structure points 32 of the anterior eye portion 28 of the left eye 30 passes neither through the left nor the right spectacle lens 18, 20 in the spectacle frame during the capture, and/or an image of the at least two structure points 32 of the anterior eye portion 28 of the right eye 36 without the right spectacle lens 20 of the spectacle frame 22 or without the spectacle frame 22 containing the right spectacle lens 20, or with the right spectacle lens 20, wherein the imaging beam path 52 underlying the image of the at least two structure points 32 of the anterior eye portion 28 of the right eye 36 passes neither through the left nor the right spectacle lens 18, 20 in the spectacle frame 22 during the capture;

a step of calculating spectacle frame information data containing information from the group of position, relative position, shape and coordinates of the spectacle frame 22 from at least two image representations containing an identical portion of the spectacle frame 22 from the group of the at least two first image representations 39, 39', 39" and the at least two second image representations 41, 41', 41" in a coordinate system 25" that is referenced to a coordinate system 25 which is stationary with respect to the head 24 of the spectacle wearer, by means image evaluation;

a step of calculating the coordinates of the at least two structure points 32 of the anterior eye portion 28 of the left eye 30 and/or the at least two structure points 32, 32' of the anterior eye portion 28 of the right eye 36 from the at least two second image representations 41, 41', 41" in a coordinate system 25" that is referenced to a coordinate system 25 which is stationary with respect to the head 25 of the spectacle wearer, by means of image evaluation;

a step of determining the visual point (x,y) through the left spectacle lens 18 from at least one first image representation, in each case from a center of an image structure determined from the image of an anterior eye portion 28 of the left eye 30 by means of image evaluation or by manual marking from the group of pupil image, iris image and the spectacle frame information data, and/or determining the visual point (x,y) through the right spectacle lens 20 from at least one first image representation, in each case from a center of an image structure 33 determined from the image of an anterior eye portion 28 of the right eye 36 by means of image evaluation or by manual marking from the group of pupil image, iris image and the spectacle frame information data; and a step of determining a local dioptric power of the left spectacle lens 18 at the visual point 54, in which the local refractive power k(x,y) of the left spectacle lens 18 is determined at the visual point 54 from the coordinates of the at least two structure points 32 of the anterior eye portion 28 of the left eye 30 calculated from the at least two second image representations 41, 41', 41" and from an image of these at least two structure points 32 in an image representation from the group of the at least two first image representations 39, 39', 39"; and/or a local dioptric power of the right spectacle lens 20 at the visual point 54, in which the local refractive power k(x,y) of the right spectacle lens 20 is determined at the visual point 54 from the coordinates of the at least two structure points 32 of the anterior eye portion 28 of the right eye 36 calculated from the at least two second image representations 41, 41', 41" and from an image of these at least two structure points 32 in an image representation from the group of the at least two first image representations 39, 39', 39."

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 Apparatus
12 Image capture device
14 Computer unit
16, 16', 16" Point
18 Left spectacle lens
20 Right spectacle lens
22 Spectacle frame
23 Portion of spectacle frame
24 Head
25, 25' Coordinate system
25" Coordinate system of the image capture device
26, 26', 26" Recording position
28 Anterior eye portion
30 Left eye
30' Apparent left eye
31 Left pupil center
32 Structure point
33 Structure
34, 34', 34" Line of sight of the left eye
36 Right eye
36' Apparent right eye
37 Right pupil center
38, 38', 38" Line of sight of right left eye
39, 39', 39" First image representation
41, 41', 41" Second image representation
42 Pupil of the left eye
43 Point in space
44 Pupil of the right eye
45 Eye rotation point of the left eye
45' Eye rotation point of the apparent left eye
47 Eye rotation point of the right eye
47' Eye rotation point of the apparent right eye
48 Image plane
50 Chief ray
52 Imaging beam path
54 Visual point
134 Assumed line of sight of the left eye
136 Assumed line of sight of the right eye
138 Offset

The invention claimed is:

1. A method for measuring a local refractive power and/or a refractive power distribution of a left and/or a right spectacle lens in a spectacle frame in a worn position on a head of a spectacle wearer, the method comprising:

capturing at least two first image representations from different recording positions relative to the head, with the at least two first image representations each containing:

an image of i) an anterior eye portion of a left eye or ii) the anterior eye portion of the left eye and a part of a face with in each case at least two spaced apart structure points and at least one portion of the spectacle frame in the worn position therein, wherein the left eye in each case has a line of sight that points to a recording position and wherein an imaging beam path that images at least two structure points passes through the left spectacle lens, and/or alternatively an image of i) an anterior eye portion of a right eye or ii) the anterior eye portion of the right eye and the part of the face with in each case at least the two spaced apart structure points and the at least one portion of the spectacle frame in the worn position therein, wherein the right eye in each case has the line of sight that points to the recording position and wherein the imaging beam path that images the at least two structure points passes through the right spectacle lens;

capturing at least two second image representations from the different recording positions relative to the head, with the at least two second image representations each containing:

an image of the at least two spaced apart structure points of i) the anterior eye portion of the left eye or ii) the anterior eye portion of the left eye and the part of the face without the spectacle frame containing the left spectacle lens, and/or alternatively an image of the at least two structure points of i) the anterior eye portion of the right eye or ii) the anterior eye portion of the right eye of the part of the face without the spectacle frame containing the right spectacle lens;

calculating coordinates of the at least two structure points of i) the anterior eye portion of the left eye or ii) the anterior eye portion of the left eye and the part of the face and/or the at least two structure points of i) the anterior eye portion of the right eye or ii) the anterior eye portion of the right eye and the part of the face from the at least two second image representations in the coordinate system that is referenced to a coordinate system which is stationary with respect to the head of the spectacle wearer, by image evaluation with triangulation;

determining a visual point through the left spectacle lens from the at least one first image representation, in each case from a center of an image structure determined from the image of the anterior eye portion of the left eye by image evaluation selected from a group of pupil image, iris image, and spectacle frame information data, and/or determining the visual point through the right spectacle lens from the at least one first image representation, in each case from the center of the image structure determined from the image of the anterior eye portion of the right eye by image evaluation selected from the group of pupil image, iris image, and spectacle frame information data, wherein spectacle frame information data containing information selected from a group of position, relative position, shape, and coordinates of the spectacle frame are calculated by image evaluation with triangulation from at least two image representations containing an identical portion of the spectacle frame from the group of the at least two first image representations in a coordinate system that is referenced to the coordinate system which is stationary with respect to the head of the spectacle wearer; and determining a local dioptric power of the left spectacle lens at the visual point from the coordinates, calculated from the at least two second image representations, of at least the structure points of i) the anterior eye portion of the left eye or ii) the anterior eye portion of the left eye and the part of the face and from the at least two first image representations with images of the at least two structure points, and the local refractive power $k(x,y)$ of the left spectacle lens at the visual point from a ratio of a size of a structure, ascertained based on the at least two structure points in at least one of the at least two first image representations to the size of the structure in at least one of the at least two second image representations; and/or a local dioptric power of the right spectacle lens at the visual point from the coordinates, calculated from the at least two second image representations, of the at least two structure points of the anterior eye portion of the right eye or ii) the anterior eye portion of the right eye and the part of the face, and the local refractive power $k(x,y)$ of the right spectacle lens at the visual point from a ratio of a size of a structure, ascertained based on the at least two structure points in at least one of the at least two first image representations to the size of the structure in the at least one of the at least two second image representations.

2. The method as claimed in claim 1, wherein determining the local dioptric power of the left spectacle lens at the visual point further comprises determining the local prismatic effect based on the coordinates of an eye rotation point or based on an offset of the anterior eye portion in the image of the left eye and/or determining the local dioptric power of the right spectacle lens at the visual point further comprises determining the local prismatic effect based on the coordinates an eye rotation point or based on an offset of the anterior eye portion in the image of the right eye, wherein the coordinates of the eye rotation point of the left eye and/or the coordinates of the eye rotation point of the right eye are determined from an eye diameter $D_L$ assumed for the left eye and/or from an eye diameter $D_R$ assumed for the right eye and from coordinates of at least one structure point of the head in a coordinate system that is referenced to a coordinate system which is stationary with respect to the head of the spectacle wearer, and wherein these coordinates are determined from at least two image representations selected from a group of the at least two first image representations and the at least two second image representations.

3. The method as claimed in claim 1, wherein the at least two first image representations and the at least two second image representations are captured with at least one image capture device which is displaced relative to the head of the spectacle wearer by virtue of the image capture device and/or the head of the spectacle wearer being moved.

4. The method as claimed in claim 3, wherein the at least one image capture device is held in a hand and/or in that a Simultaneous Localization and Mapping (SLAM) algorithm is used for determining extrinsic parameters of the at least one image capture device comprising the position and relative position thereof in space when recording the at least two first image representations and/or the at least two second image representations.

5. The method as claimed in claim 4, wherein the SLAM algorithm is used for calculating intrinsic parameters of the image capture device.

6. The method as claimed in claim 5, wherein the intrinsic parameters are selected from a group of focal length, image center, shear parameters, scaling parameters, and distortion parameters.

7. The method as claimed in claim 1, wherein for calculating the coordinates of the at least two structure points and/or for calculating the refractive power from the at least two structure points of the first image representations, a feature detection method is performed for detecting images of suitable structure points and a feature matching method is performed for detecting the image of corresponding structure points in the at least two first image representations and/or the at least two second image representations.

8. The method as claimed in claim 7, wherein the local refractive power of the left spectacle lens is calculated from a derivative of a gradient field with an optimization method, the gradient field being ascertained from the deflection of the imaging beam path for the image of the center of an image structure selected from the group of pupil image, iris image of the anterior eye portion of the left eye by the left spectacle lens of the spectacle frame; and/or in that the local refractive power of the right spectacle lens is calculated from the derivative of the gradient field with the optimization method, the gradient field being ascertained from the deflection of the imaging beam path for the image of the center of an image structure selected from the group of pupil image, iris image of the anterior eye section of the right eye by the right spectacle lens of the spectacle frame.

9. The method as claimed in claim 1, wherein the dioptric power of the left and/or right spectacle lens at the visual point is determined from a shape difference and/or a size difference of images of the structures having the at least two structure points in the at least two first image representations and/or the at least two second image representations.

10. The method as claimed in claim 1, wherein a lens is modeled for determining the local refractive power of the left spectacle lens, the lens having two surfaces and a lens material refractive index, wherein radii of curvature of at least one of the surfaces and the lens material refractive index of the lens are calculated in an optimization method, and/or a lens is modeled for determining the local refractive power of the right spectacle lens, the lens having two surfaces and a lens material refractive index, and wherein radii of curvature of at least one of the surfaces and the refractive index of the lens are calculated in an optimization method.

11. The method as claimed in claim 10, wherein the optimization method is formulated as an inverse approach.

12. The method as claimed in claim 1, wherein a SLAM algorithm is used to calculate the coordinates of the at least two structure points; and/or in that the anterior eye portion of the left and/or right eye and/or the spectacle frame is segmented in the at least two first image representations and/or the at least two second image representations.

13. A method for measuring a refractive index distribution of a left and/or a right spectacle lens in a spectacle frame, wherein a local refractive power of the left and/or of the right spectacle lens is measured as claimed in claim 1 at a multiplicity of different points of the left and/or right spectacle lens.

14. The method as claimed in claim 1, wherein the at least two spaced apart structure points captured in the at least two first image representations and in the at least two second image representations are identical.

15. The method as claimed in claim 1, wherein the local refractive power comprises the local focal power or the local dioptric power and the refractive power distribution comprises a spatially resolved focal power or the spatially resolved dioptric power.

16. The method as claimed in claim 1, wherein when capturing the at least two second image representations the line of sight is identical to the line of sight when capturing the at least one first or the at least two first image representations or in that the line of sight is any desired when capturing the at least two second image representations.

17. The method as claimed in claim 1, wherein the image evaluation of each first and second image representation comprises image processing technologies selected from methods for object recognition and triangulation.

18. The method as claimed in claim 17, wherein methods for object recognition are conventional in character, selected from the group consisting of thresholding, edge- or region-based segmentation and optical flow, or are learning in character, selected from learning algorithms.

19. The method as claimed in claim 1, wherein the at least two structure points of the at least one first image representation or the at least two first image representations and the at least two second image representations are identical.

20. The method as claimed in claim 1, wherein there furthermore is a determination of centration parameters of the spectacle frame in the worn position.

21. The method as claimed in claim 20, wherein local refractive power and/or the refractive power distribution of the respective spectacle lens is converted into a refractive value for the left and/or right eye.

22. The method as claimed in claim 1, wherein the local refractive power, the refractive power distribution and/or the centration parameters are determined by means of an inverse approach.

23. The method as claimed in claim 1, wherein the at least one first image representation or the at least two first image representations and the at least two second image representations are captured by means of at least one mobile terminal that comprises at least one image capture device.

24. A computer program product comprising a computer program having program code for carrying out all method steps which are specified in claim 1 when the computer program is loaded on a computer unit and/or executed on a computer unit.

25. A non-transitory computer-readable storage medium comprising instructions which, upon execution by a computer, cause the latter to carry out all method steps that are specified in claim 1.

26. A non-transitory computer-readable data medium, on which the computer program of the computer program product as claimed in claim 24 is stored.

27. An apparatus for measuring the local refractive power of a left and/or a right spectacle lens in a spectacle frame using an image capture device and using a computer unit, loaded in which is a computer program with program code for carrying out the method as claimed in claim 1.

* * * * *